(12) United States Patent
Walker

(10) Patent No.: US 11,601,603 B2
(45) Date of Patent: Mar. 7, 2023

(54) SYSTEM AND METHOD FOR REAL-TIME CAMERA TRACKING TO FORM A COMPOSITE IMAGE

(71) Applicant: Matthew Walker, Los Angeles, CA (US)

(72) Inventor: Matthew Walker, Los Angeles, CA (US)

( * ) Notice: Subject to any disclaimer, the term of this patent is extended or adjusted under 35 U.S.C. 154(b) by 0 days.

(21) Appl. No.: 16/857,706

(22) Filed: Apr. 24, 2020

(65) Prior Publication Data

US 2020/0344425 A1 Oct. 29, 2020

Related U.S. Application Data

(60) Provisional application No. 62/838,277, filed on Apr. 24, 2019.

(51) Int. Cl.
| | |
|---|---|
| *H04N 5/262* | (2006.01) |
| *H04N 13/189* | (2018.01) |
| *H04N 13/221* | (2018.01) |
| *H04N 5/232* | (2006.01) |

(52) U.S. Cl.
CPC ....... *H04N 5/2625* (2013.01); *H04N 5/23232* (2013.01); *H04N 13/189* (2018.05); *H04N 13/221* (2018.05)

(58) Field of Classification Search
USPC .......................................................... 348/50
See application file for complete search history.

(56) References Cited

U.S. PATENT DOCUMENTS

| | | | | |
|---|---|---|---|---|
| 7,719,563 | B2* | 5/2010 | Richards | H04N 21/242 |
| | | | | 348/36 |
| 7,921,997 | B2* | 4/2011 | Burns | G06F 1/1626 |
| | | | | 206/320 |
| 8,761,580 | B2 | 6/2014 | Gausereide | |
| 9,177,384 | B2 | 11/2015 | Weisenburger | |
| 2008/0123994 | A1* | 5/2008 | Schultz | G06T 7/50 |
| | | | | 382/284 |
| 2011/0148623 | A1* | 6/2011 | Bishop | G01C 21/20 |
| | | | | 340/539.13 |
| 2012/0127157 | A1* | 5/2012 | Adler | A61B 5/0024 |
| | | | | 345/419 |
| 2015/0346722 | A1* | 12/2015 | Herz | G05D 1/0027 |
| | | | | 701/2 |

(Continued)

*Primary Examiner* — Mikhail Itskovich
(74) *Attorney, Agent, or Firm* — Eandi Fitzpatrick LLP

(57) ABSTRACT

A system and method for tracking the movement of a recording device to form a composite image is provided. The system has a user device with a sensor array capturing motion data and velocity vector data of the recording device when the recording device is in motion, an attachment member for coupling the user device to the motion capturing device, and a server with program modules. The program modules described are a calibration module for calibrating a position of the user device relative to a position of a lens of the recording device, a recorder module for receiving the motion data and velocity vector data from the sensor array; and a conversion module for combining the position of the user device relative to the lens of the recording device, and the motion data and velocity vector data and transforming the data into a file that is usable by a compositing suite, a three-dimensional application, or both.

20 Claims, 20 Drawing Sheets

(56) References Cited

U.S. PATENT DOCUMENTS

| | | | |
|---|---|---|---|
| 2016/0026874 A1* | 1/2016 | Hodulik | H04N 21/8549 |
| | | | 386/281 |
| 2017/0085796 A1* | 3/2017 | Rangam | H04N 5/772 |
| 2018/0137632 A1 | 5/2018 | Takada | |
| 2018/0232815 A1* | 8/2018 | Kopans | G06Q 30/0282 |
| 2019/0222776 A1 | 7/2019 | Carter et al. | |

* cited by examiner

SYSTEM AND METHOD FOR REAL-TIME CAMERA TRACKING TO FORM A COMPOSITE IMAGE

CROSS-REFERENCE TO RELATED APPLICATIONS

This application claims the benefit of U.S. Provisional Patent Application Ser. No. 62/838,277 filed Apr. 24, 2019 entitled System and Method for Real-Time Tracking and Formation of a Composite Image, the entire contents of which are incorporated by reference herein for all purposes.

FIELD OF THE INVENTION

The present invention generally relates visual effects (VFX) and the formation of a composite image using motion tracking. More specifically, the present invention relates to a system and method for real-time tracking of a camera providing live recording of a subject and to process the data received for a three-dimensional composite n image thereby obviating the need for match moving.

BACKGROUND OF THE INVENTION

In visual effects (VFX), match moving (or camera solving as it is sometimes referred to) is a technique that allows the insertion of computer graphics or three-dimensional (3D) data into live-action footage with correct position, scale, orientation, and motion relative to the photographed or filmed objects in the shot. Generally, to accomplish these goals, shots recorded in principle photography are processed by image analysis software to composite images. The software identifies and compares patterns frame by frame, and by identifying the changes in these patterns, the software can triangulate the camera's position and rotation over time as well as approximating the lens profile used during principle photography. There are two principal elements in match moving: (1) Tracking and (2) Calibration.

One such type of tracking that is being relied upon more and more is real-time tracking. Real-time tracking involves 3D tracking of cameras themselves. To achieve this; a number of components from hardware to software need to be combined. Software collects all of the six degrees of freedom movement of the camera as well as metadata such as zoom, focus, iris and shutter elements from many different types of hardware devices, ranging from motion capture systems such as active LED marker based system, passive systems, to rotary encoders fitted to camera cranes and dollies or inertia gyroscopic sensors mounted directly to the camera, the sensor then being hooked in to the hardware and software components.

These tracking systems are extremely cost prohibitive and require a cumbersome amount of hardware to accomplish. The cost of these systems may range from $5,000 to $500,000 and usually requires a dedicated computing system. These systems also require extensive knowledge, where some productions are forced to hire costly contractors, or pay for training their own employees. In addition, these systems usually require wire tethers from the camera body to the processing device or require an entire sound stage to be rigged with cameras and feature trackers. This not only limits the principle camera's range and maneuverability; it also limits the shooting location to sound stages that can safely house such expensive equipment. Due to these complications, real time 3D tracking is usually not preferred over image analysis. Furthermore, all current solutions are simply not available to productions without budgets that generally exceed tens millions of dollars.

As such, a majority of productions have no choice but to use image analysis, which is time extensive and prone to a myriad of errors. As an example, image analysis outcomes are influenced by the quality of the image, exposure, noise and objects that occlude the tracking features. These limitations can prevent an accurate solution from being accomplished or increase the amount of time it would take a match-mover to solve a shot. These limitations also inhibit the choices of creators. During principle photography, creators will often break up visual effect's shots into different elements with the intent of being composited later, which consumes production time. Once a shot is match-moved, it is handed to a compositor which will use the match-moved information to add or remove elements into a composite. If the match-moved information is inaccurate, the compositor cannot believably composite elements into the final shot. Furthermore, these cumbersome systems limit time and location options because the equipment is unduly expensive and have large footprints.

Therefore, there is a need for a system and method that obviates the user having to manually perform match moving in VFX to insert a 3D composite image into media.

SUMMARY OF THE INVENTION

The present invention discloses a system and method that automates match moving and provides for real time 3D tracking of a recording device such as a video camera. The system is configured to approximate at least the orientation and velocity of the camera to provide a visual effect in a live recording by utilizing smartphone hardware, a mobile application, servers, displays, networks, and/or dedicated software of firmware.

Advantageously, the system automates the match moving (or camera solving) process.

Advantageously, the system allows a creator of audiovisual media to use an application that reads sensor array data from various sensors of a mobile device attached to a digital movie camera to approximate the rotation and velocity of the movie camera to be used in 3D applications and compositing software.

Advantageously, the system provides a cost-effective system to remove the barrier of entry for creators to include visual effects in their projects. The system avoids cables, expensive sound stage, reduced footprint, and costly equipment. The system can be used in any location and on any movie camera using a mobile device and an attachment member. This solves the budgetary and logistical problems that are associated with using current solution.

Advantageously, the system avoids the need to perform image analysis or segmenting a shot into separate pieces to avoid occlusion of tracking features, bypasses match-moving processes that are difficult to accomplish, whilst delivering an accurate 3D camera solve directly from principle photography in real time.

In one embodiment, a system for capturing approximate orientation and velocity of movie camera is provided. The system comprises a user device (e.g., smartphone), an attachment member for attaching the smartphone to a movie camera, a network (e.g., cloud), and a data processing module that utilizes data received from various sensors and in some embodiments, image capturing devices of a smartphone.

In one embodiment, the user device comprises an array of sensors. The server comprises a composite module and at least one database in communication with the server for storing motion related information. The user device associated with a user is connected or otherwise coupled to the recording device and configured gather data on the orientation and velocity of a movie camera in three rotation axes and three velocity measurement (axes and velocity vectors), amongst other parameters, and send the data via a network to a database The application accesses the data that is directed toward the 3D motion of the video camera. In one embodiment, the 3D motion data comprises complete spatial orientation and velocity of the movie camera during the shooting of a scene. The server comprises a processor and a memory, and the memory comprises a set of program modules: An input module, a calibration module, an output module, and a recorder module.

In one embodiment, a system for tracking the movement of a recording device to form a composite image the system comprising a user device having a sensor array, wherein the sensor array captures at least a motion data and a velocity vector data of the recording device when the recording device is in motion; an attachment member for coupling the user device to the motion capturing device; a server comprising a processor and a memory in communication with the processor, wherein the server stores a set of program modules executable by the processor, the program modules comprising a calibration module for calibrating a position of the user device relative to a position of a lens of the recording device; a recorder module for receiving the motion data and velocity vector data from the sensor array; and a conversion module for combining and reformatting the position of the user device relative to the lens of the recording device, and the motion data and velocity vector data and transforming the data into a file that is usable by a compositing suite, a three-dimensional application, or both.

A method for tracking the movement of a recording device to form a composite image comprising coupling a user device having a sensor array to the recording device, wherein the sensor array captures at least a motion data and a velocity vector data of the recording device when the recording device is in motion; calibrating a position of the user device relative to a position of a lens of a recording device; receiving the motion data and velocity vector data from the sensor array at a server; combining and reformatting the position of the user device relative to the lens of the recording device and the motion data and velocity vector data; transforming the data into a file that is usable by a compositing suite, a three-dimensional application, or both.

In one embodiment, the program modules further comprise a registration module, a profile management module, a search engine, a data sharing module, a notification module, and a file conversion module. The registration module, executed at the processor, enables the user to input user identification data for registration. The profile management module, executed at the processor, enables the user to manage profile data. The search engine executed at the processor, in communication with the recording module, enables the user to search for the captured 3D motion data. The data sharing module executed at the processor, in communication with the recording module, shares the captured 3D motion data to one or more users. In one embodiment, one or more user devices are in communication with the server via the network. In some embodiments, the network is at least anyone of a Local Area Network, a Wide Area Network, a Wireless Network, a telecommunication network, a mobile network, and an Internet. The notification module, executed at the processor, is configured to provide notification on receiving one or more data from one or more users. The file conversion module, executed at the processor, is converts the captured 3D motion data into a desired file format.

In one embodiment, a method for capturing 3D motion data is disclosed. In one embodiment, the method is executable by processor and a memory in communication with the processor, and provides a database in communication with the server, and a user device connected to the recording device comprising an array of sensors. The method comprises calibrating at the processor, via a calibration module, a position of the user device with a position of the movie camera (e.g., distance from user device to lens of the camera in all spatial directs); enabling a user to input data relating to the positioning of the user device and the smart phone. At another step, the method comprises approximating the lens profile (e.g., 25 mm, 8 mm, 35 mm) of the particular movie camera that is being used, and further, capturing 3D motion data of the recording device in real time, and using the data captured to form a composite image.

Other features, advantages, and aspects of the present invention will become more apparent and be more readily understood from the following detailed description, which should be read in conjunction with the accompanying drawings.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
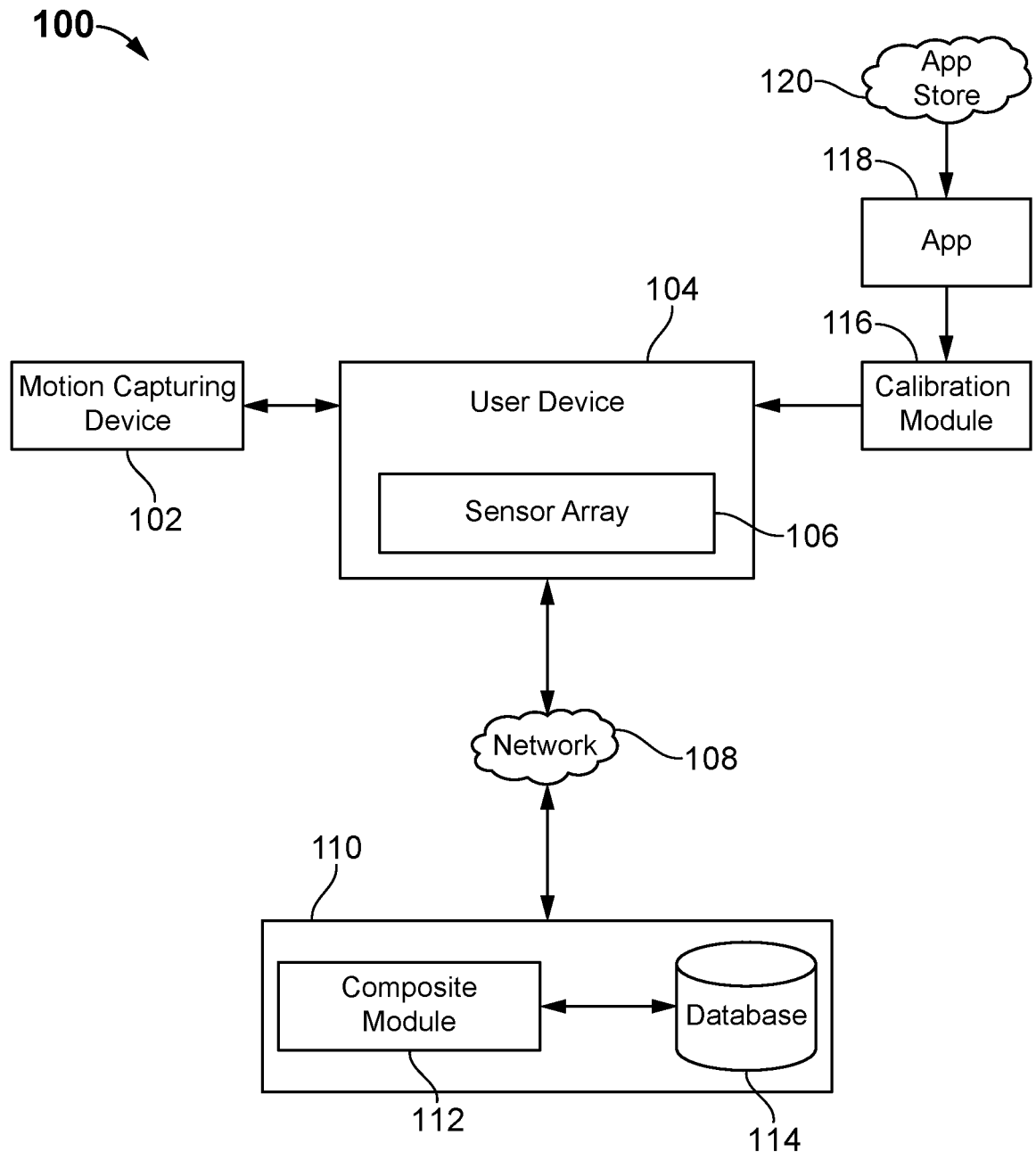
FIG. 1 illustrates a block diagram of an environment implemented, according to an embodiment of the present invention.

The present invention is best understood by reference to the detailed description and examples set forth herein.

Embodiments of the invention are discussed below with reference to the examples. However, those skilled in the art will readily appreciate that the detailed description given herein with respect to these examples is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention.

For purposes of illustrating features of the embodiments, a simple example will now be introduced and referenced throughout the disclosure. Those skilled in the art will recognize that this example is illustrative and not limiting and is provided purely for explanatory purposes. An example of a computing system environment is disclosed. The computing system environment is not intended to suggest any limitation as to the scope of use or functionality of the system and method described herein. Neither should the computing environment be interpreted as having any dependency or requirement relating to any one or combination of components illustrated in the exemplary operating environment.

Embodiments of the disclosure are operational with numerous other general purposes or special purpose computing system environments or configurations. Examples of well-known computing systems, environments, and/or configurations that may be suitable for use with the systems and methods described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The embodiments of the disclosure may be described in the general context of computer-executable instructions, such as program modules, being executed by a computer. Generally, program modules include routines, programs, objects, components, data structures, etc. that perform particular tasks or implement particular abstract data types. The systems and methods described herein may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the exemplary embodiments as processor executable instructions, which can be written on any form of a computer readable media in a corresponding computing environment according to this disclosure.

Computer storage media includes both volatile and non-volatile, removable and non-removable media implemented in any method or technology for storage of information such as computer readable instructions, data structures, program modules or other data. Computer storage media includes, but not limited to, Random Access Memory (RAM), Read-Only Memory (ROM), Electrically Erasable Read-Only Memory (EEPROM), flash memory or other memory technology, The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The present invention provides a system and method for obviating manual match making during in VFX. The system and methods provide for real-time tracking of a movie camera providing live recording of a subject, and process the data received for a three-dimensional composite via mobile application.

The present invention provides for insertion of computer graphics or three-dimensional (3D) data into live-action footage with correct position, scale, orientation, and motion relative to the photographed or filmed objects in the shot.

The system and method for capturing approximate orientation and velocity details of a camera to provide VFX within a live recording of a subject. The system enables a user to capture an accurate 3D motion directly from principle photography in real time.

As used herein, the term "motion capturing device" may be used to describe a video camera or any image capturing device.

Referring now to FIG. 1, a block diagram of a system 100 implemented in accordance with various embodiments of the present invention is disclosed. The system 100 comprises a motion capturing device or recording device (e.g., filmmaking camera) 102, a user device (e.g., smartphone) 104, a network (e.g., cloud) 108, and a server 110. In one embodiment, the user device 104 comprises an array of sensors 106. In one embodiment, the server 110 comprises a composite module 112 and at least one database 114. In an embodiment, the user device 104 is in communication with a calibration module 116 which may be implemented in the form of a mobile application 118 downloadable onto the app store 120. All elements of the system are in communication with each other via a network or Bluetooth® communication, as an example.

In one embodiment, the user device 104 is connected to the body or rig of the recording device 102 using an attachment member. A server 110 is in communication with a network 108 and the user device 104. The user device 104, using the various sensors therein, captures the 3D motion data and sends it to the server 110 for storage in a database 114. In an embodiment, the 3D motion data comprises orientation and velocity of the recording device 102. In an embodiment, the sensor array 106 comprises sensors that are generally built into smart devices including but not limited to: An accelerometer, gyroscope, magnetometer, proximity sensor, ambient light sensor, thermometer, bar code sensor IR sensor, and the like. The accelerometer detects acceleration, vibration, and tilt to determine movement and exact orientation along the three axes, and can also determine if the phone screen is facing upward or downward. The accelerometer detects how fast the phone is moving in any linear direction. The gyroscope provides orientation details and direction such as up/down and left/right but with greater precision as it relates to the device is tilt. The magnetometer (or compass) can detect magnetic fields, so the compass app in phones uses this smartphone sensor to point at the planet's north pole In optional embodiments, a proximity sensor may be use infrared LED and IR light detector ascertain the position of the user device 104 to the motion capturing device 102.

The absolute orientation of the user device 104 phone is represented in angles yaw, pitch, and roll. It is detected by a combination of the accelerometer, compass, and gyroscope. The data received from these sensors is sent to calibration module 116

The calibration module 116 is provided to continuously calibrate and record the 3D motion data of the recording device 102 based on the position of the recording device 102. The calibration module 116 is further configured to store information (via database 114) on the lens profile of the recording device 102 and the information related to the distance and orientation of the user device 104 relative to the lens of the recording device 102.

The user device 104 is in communication with the network 108 to access the composite module 112. In an embodiment, the network 108 is cloud or wireless local area network.

In an embodiment, the at least one database 114 is accessed by the composite module 112. The composite module 112 is configured to utilize the data received from the user device 104 and the recording device 102 and sync that data to the network 108 or hold it in local storage to be synced at a later time, as defined by the user. The composite module 112 is configured to convert the data into one or more of several file types example, .fbx or .aec, and perform additional intermediate conversion steps that are further described in FIG. 3. Once downloaded in a form usable to the user, the user can then open their files in a composite suite or 3D application (e.g., as Maya®, Houdini®, Cinema 4D®, Adobe® After Effect and Nuke®) to form a composite image.

Still with reference to FIG. 1, in some embodiments, the database 114 resides in a connected server or in a cloud computing service 110. Regardless of location, the database 114 comprise a memory to store and organize certain data for use by the composite module 112. In some embodiments, the database 114 stores plurality of motion related information and data from the array of sensors 106.

Figure 2:
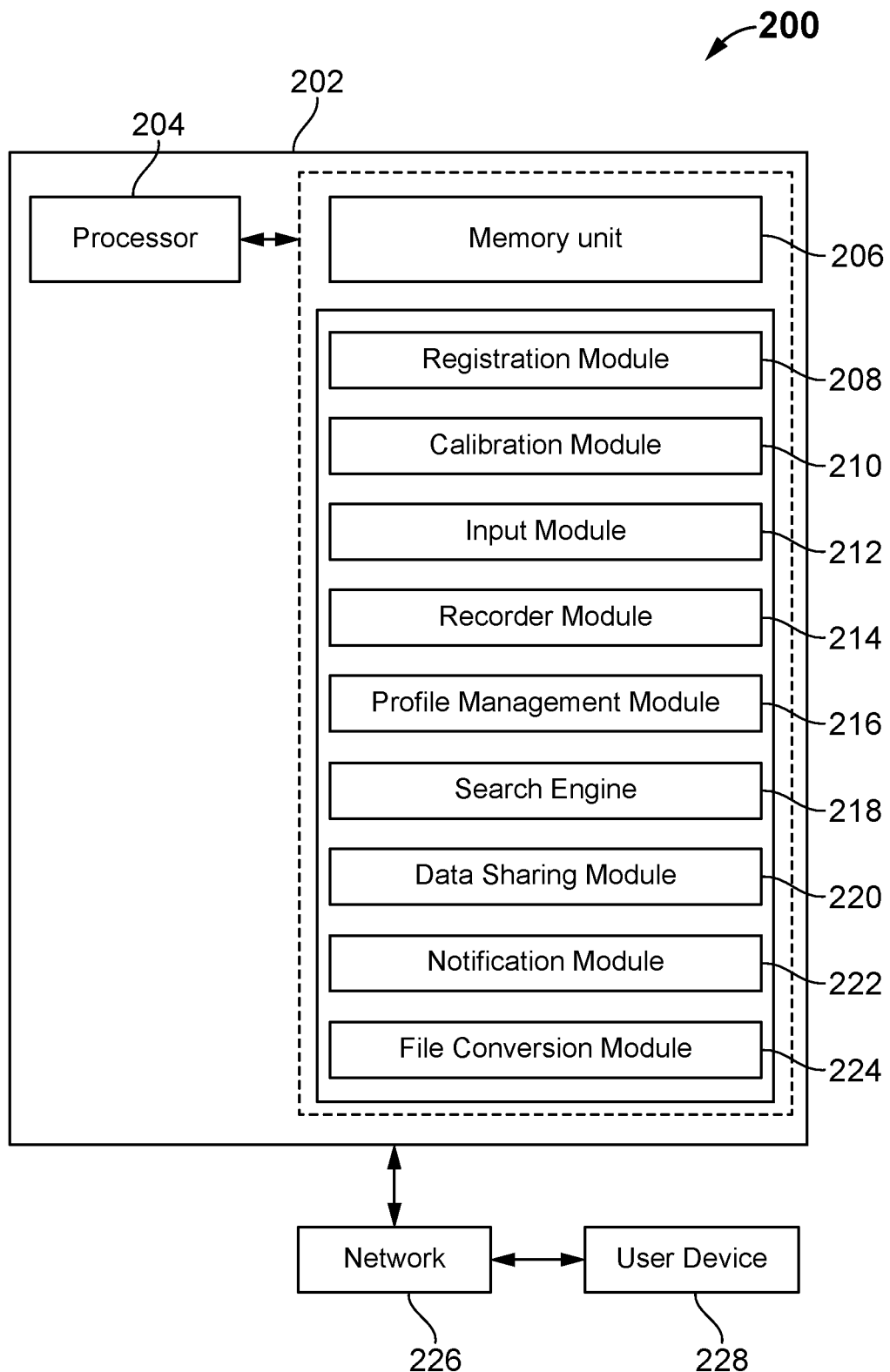
FIG. 2 illustrates a block diagram of a 3D motion tracking server, according to an embodiment of the present invention.

With reference now to FIG. 2, a block diagram 200 of the composite module 112 (shown in FIG. 1) in an embodiment of the present invention is shown. The server 202 comprises a processor 204 (shown in FIG. 2) and a memory unit 206. The memory unit 206 comprises a set of program modules comprises a registration module 208, a calibration module 210, an input module 212, a recorder module 214, a profile management module 216, search engine 218, data sharing module 220, notification module 222 and a file conversion module 224. In one embodiment, the server 202 is accessed by a user device 228 via a network 226. In some embodiments, the user device 228 is smartphone having a sensor array.

In one embodiment, the server 202 evaluates the captured motion data from various program modules in the memory unit 206. In an embodiment, the registration module 208 executed by the processor 204, enables the user to input user identification data for registration. The calibration module 210 executed by the processor 204, enables the user to calibrate position of the user device 228 to a position of the recording device 102 (shown in FIG. 1). The input module 212 executed by the processor 204, enables the user to input data relating to the array of sensors and the recording device 102. The recorder module 214 executed by the processor 204, captures the 3D motion data of the recording device 102. In one embodiment, the 3D motion data includes orientation and velocity of the recording device 102. In another embodiment, the recorder module 214 is stores captured 3D motion data in at least anyone of the database, a cloud or the user device.

In one embodiment, the profile management module 216 executed by the processor 204, enables the user to manage profile data. The search engine 218 executed by the processor 204, in communication with the recorder module 214, enables the user to search for the captured 3D motion data. In one embodiment, the data sharing module 220 executed by the processor 204, in communication with the recorder module 214, is shares the captured 3D motion data to one or more additional users. In an embodiment, one or more user devices are in communication with the server 202 via the network 226. In some embodiments, the network 226 is at least anyone of a Local Area Network, a Wide Area Network, a Wireless Network, a telecommunication network, a mobile network, and an Internet. The notification module 222 executed by the processor 204, in communication with the recorder module 214, is provides notification on receiving one or more data from one or more users. In one embodiment, the file conversion module 224 executed by the processor 204, is converts the captured 3D motion data into a desired file format.

Figure 3:
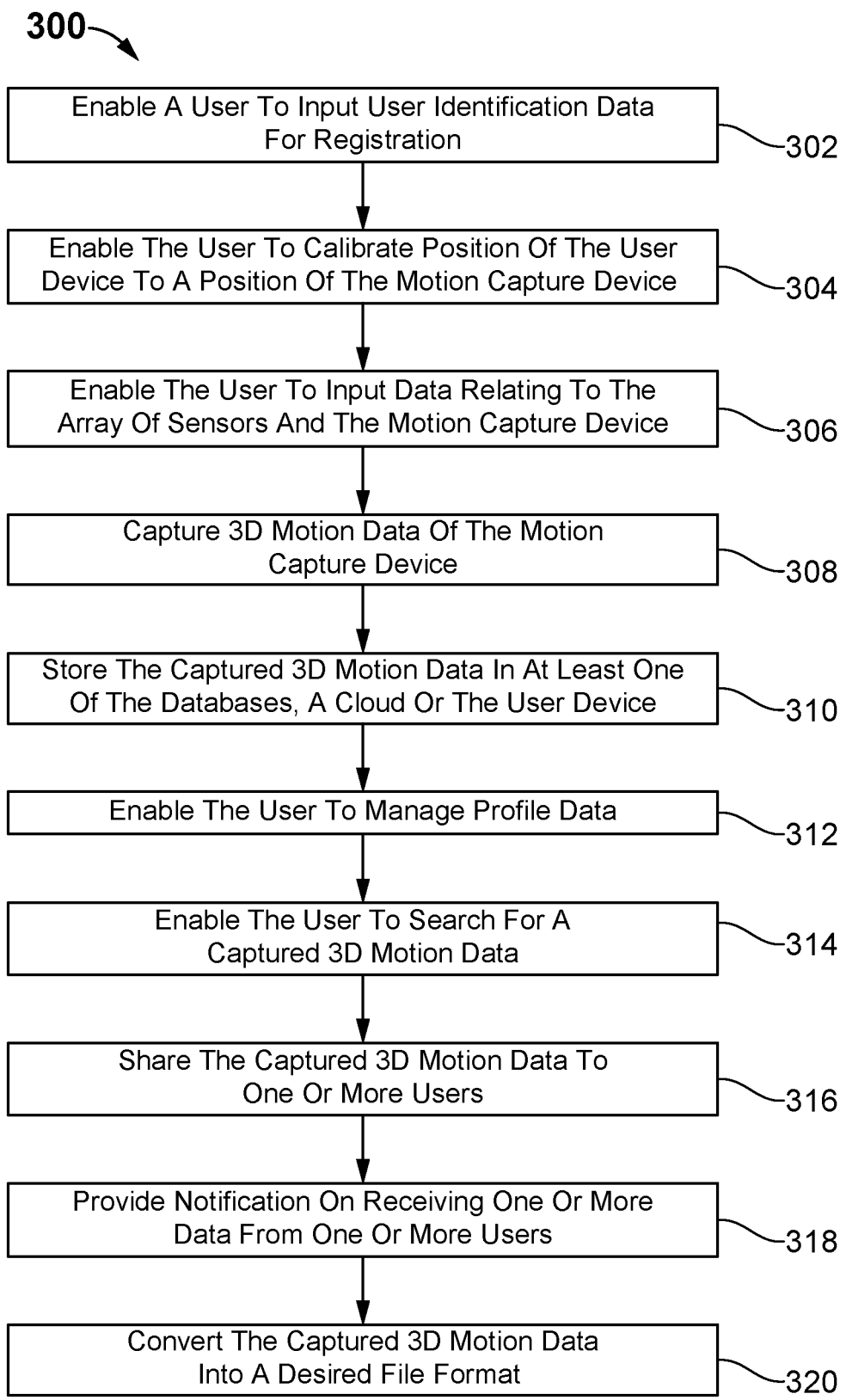
FIG. 3 is a flowchart illustrating a method for capturing 3D motion data of an object, according to an embodiment of the present invention.

Referring to FIG. 3, a flowchart illustrating a method 300 to deliver an accurate 3D camera solve directly from principle photography in real time and provide a composite image. In one embodiment, the method 300 utilizes a system that comprise server 202 (shown in FIG. 2), a processor 204 and a memory unit 206 (shown in FIG. 2) in communication with the processor 204, the database 114 (shown in FIG. 1) in communication with the server 202, and a user device 104 connected to the recording device 102 comprising an array of sensors 106 (shown in FIG. 1). In an embodiment, the user device 228 (shown in FIG. 2) is configured to access the server 202 via a network 226 (shown in FIG. 1).

At step 302, the method comprises registering at the processor 204, via a registration module 208, a user that is capturing the motion of the recording device.

At step 304, the method comprises calibrating at the processor 204, via a calibration module 210, certain user input values. The user may input various data points that will be used in calibration such as but not limited frame rate, resolution of camera (e.g., High definition, 4K), lens profile, a position of the user device 228 relative to a position of the recording device 102. The inputs are stored as an intermediary as a JSON file. This calibration step may be automated using various sensors, as well.

At step 306, the method comprises attaching the user device to the motion capture device and receiving at the server spatial orientation parameters between the two devices including but not limited to distance from user device to lens of the camera in all spatial directions. In this way, the user has all data in a small and portable device for the process At step 308, receiving, at the input module 212 (shown in FIG. 2), data from the array of sensors 106. The data comprises the motions of the camera in an (X-Y-Z matrix), and multiple velocity vectors. In operation, as the recording device is recording (e.g., for principal photography of a film), the data is captured at the processor 204, via a recorder module, again, relating to the 3D motion and velocity data of the recording device 102. It should be noted that during principle photography of films the recording device 102 is typically on rails, hanging from wires, and is constantly in motion. The sensor array captures all of the movements of the recording device 102, and the input module 212 reformats the data into data that is usable to form accurate composite images. The data is reformatted to Z-Y-X matrix so that it is usable for conversion. This data is stored in the cloud as an intermediate JSON file.

At step 310, the method further comprises reformatting the received data in the JSON File for use by a composting or 3D software. This step comprises using the user inputs of step 304 as well as the sensor data from step 308 and combining these values for a reformatting step so that it can be used by compositing software or 3D applications.

This performed with a series of sub-steps. At a first sub-step, the processor uses the combined data to ensures the orientation of coordinate system (XYZ) is consistent with 3D application or composite software. The processor confirms the direction axes, and frames per second for 3D applications (24 frames, 30 frames) and parses the data that came from the sensors as a constant stream.

At a next sub-step, the data is passed through a Kalan filter to clean up unwanted noise. Kalman filtering, also known as linear quadratic estimation (LQE), is an algorithm that uses a series of measurements observed over time, containing statistical noise and other inaccuracies, and produces estimates of unknown variables that tend to be more accurate than those based on a single measurement alone, by estimating a joint probability distribution over the variables for each timeframe.

At a next sub-step, the processor confirms the user inputs for frames per second, parses the information based on user information to ensure the JSON file is ready for use.

At step 312, the method further comprises enabling at the processor 204, via the profile management module 216 (shown in FIG. 2), the user to manage profile data.

At step 314, the method further comprises, enabling at the processor 204, via the search engine 218 (shown in FIG. 2), the user to search for a captured 3D motion data on various projects (e.g., search for JSON file).

At step 316, the method further comprises sharing at the processor 204, via the data sharing module 220 (shown in FIG. 2), the captured 3D motion data to one or more users.

At step 318, the method further comprises providing at the processor 204, via the notification module 222 (shown in FIG. 2), notification on receiving one or more data from one or more users.

At step 320, the method further comprises, converting at the processor 204, via the file conversion module 224 (shown in FIG. 2), the JSON file into a user desired file format for a 3D application or Composite software.

Figure 4:
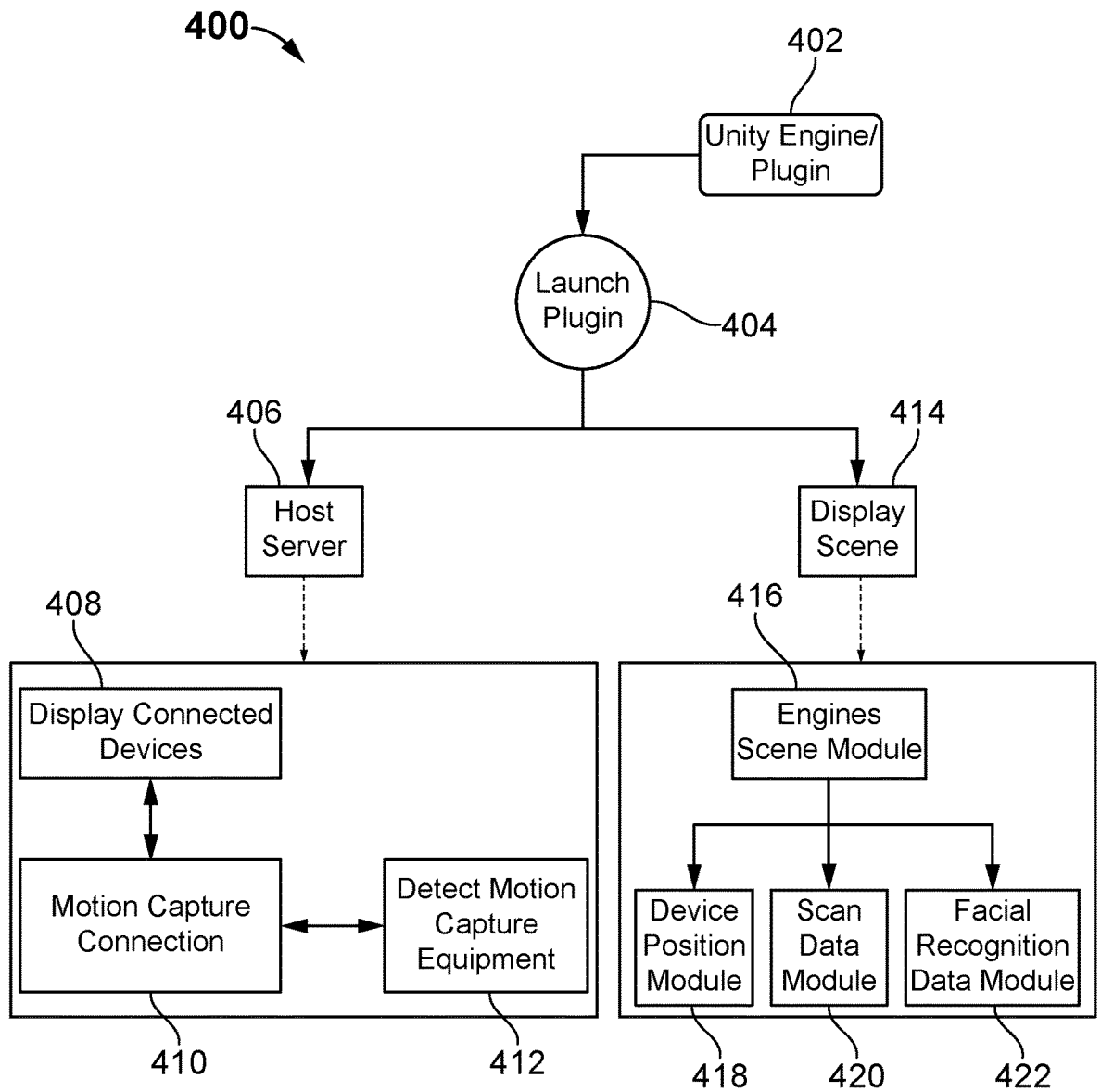
FIG. 4 illustrates a block diagram of a developmental platform engine/plugin connected to a host server and a display scene module, according to an embodiment of the present invention.

Referring now to FIG. 4, a block diagram 400 of a developmental platform plugin 402 is connected to a host server 406 and a display scene module 414 is disclosed. In one embodiment, the developmental AR engine 402 is connected to the host server 406 and the display scene module 414 via a launch plugin 404. In one embodiment, the host server 406 is further configured to connect to one or more display connected devices 408. In one embodiment, the display connected devices 408 are further connected to the motion capture connection module 410 and detection capture equipment 412.

In one embodiment, the display scene module 414 is further connected to an engine scene module 416. In one embodiment, the engine scene module 416 is configured to connect a device position module 418, a scan data module 420, and a facial recognition data module 422. In operation, the server hosts a game architecture or scene framework at the engine scene module 416 and is in communication with the module scan data module 420 to receive the data. The motion capture device or facial recognition device pipes to same scene that is hosted on the server, and all collected scene data is piped into the user device so that it may be converted into one scene file, or a "persisted scene" to composite the scene that is being shared amongst user.

Figure 5:
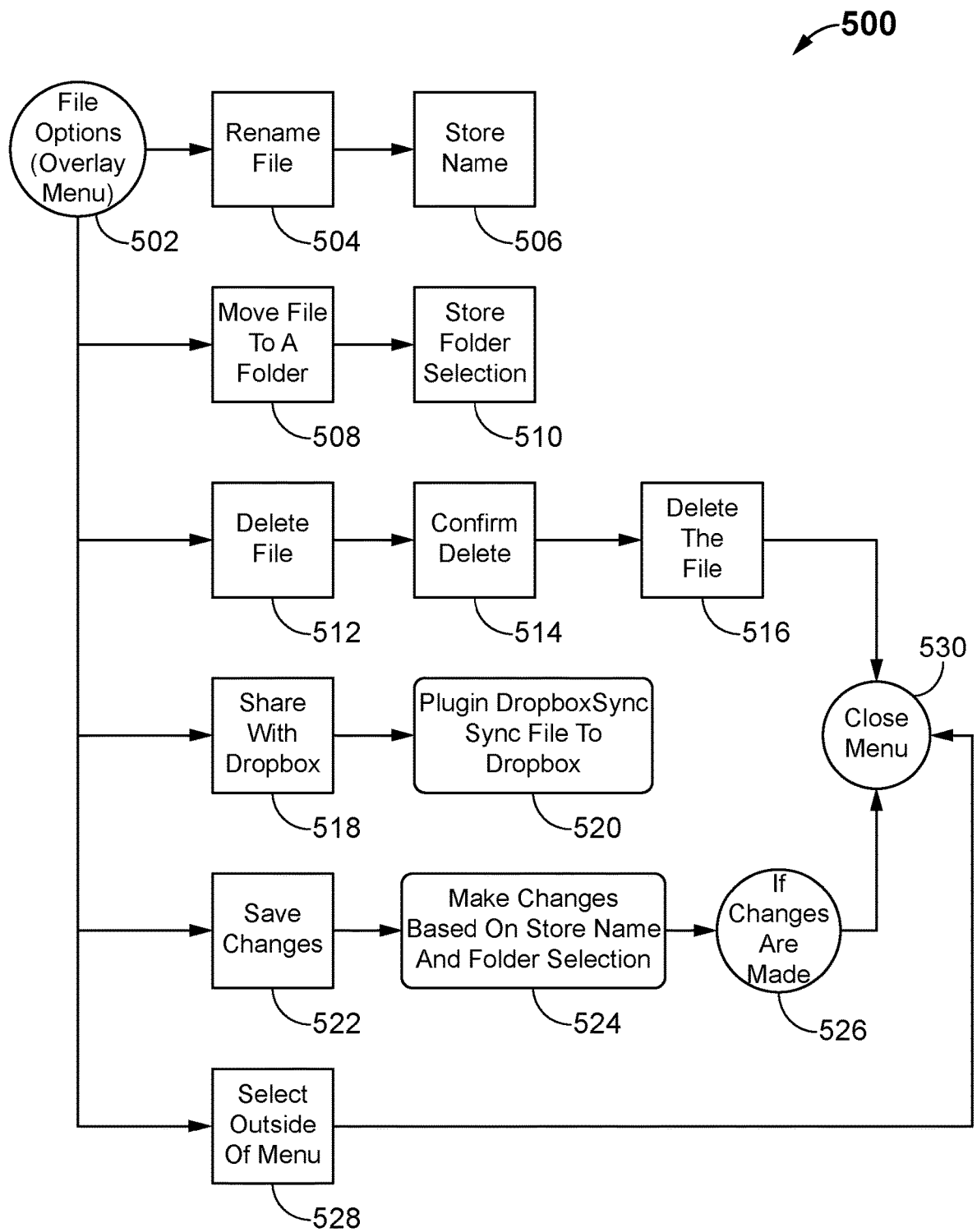
FIG. 5 illustrates a block diagram of file options (overlay menu), according to an embodiment of the present invention.

Referring to FIG. 5, a block diagram 500 of file options (overlay menu) 502 in one embodiment is disclosed. In one embodiment, the file options (overlay menu) 502 provides different options such as, but not limited to, a rename file 504, a store name 506, move file to a folder 508, a store folder selection 510, a delete file 512, share with the Dropbox® 518, save changes 522, and select outside of menu 528 for the user to access a file. In one embodiment, the file options (overlay menu) 502 is configured to enable the user to rename the files, move to another folder, delete files, and share with dropbox.

In one embodiment, the user may delete the file by confirming via the confirm delete 514 and the file is deleted using the delete the file 516 later the user could close the menu using the close menu 530. In one embodiment, the user saves the changes in the files, for example, file rename, using the save changes option 522. The user may make changes based on store name and folder selection 524 and if changes are made 526 then the user could close the menu using the close menu 530.

Figure 6:
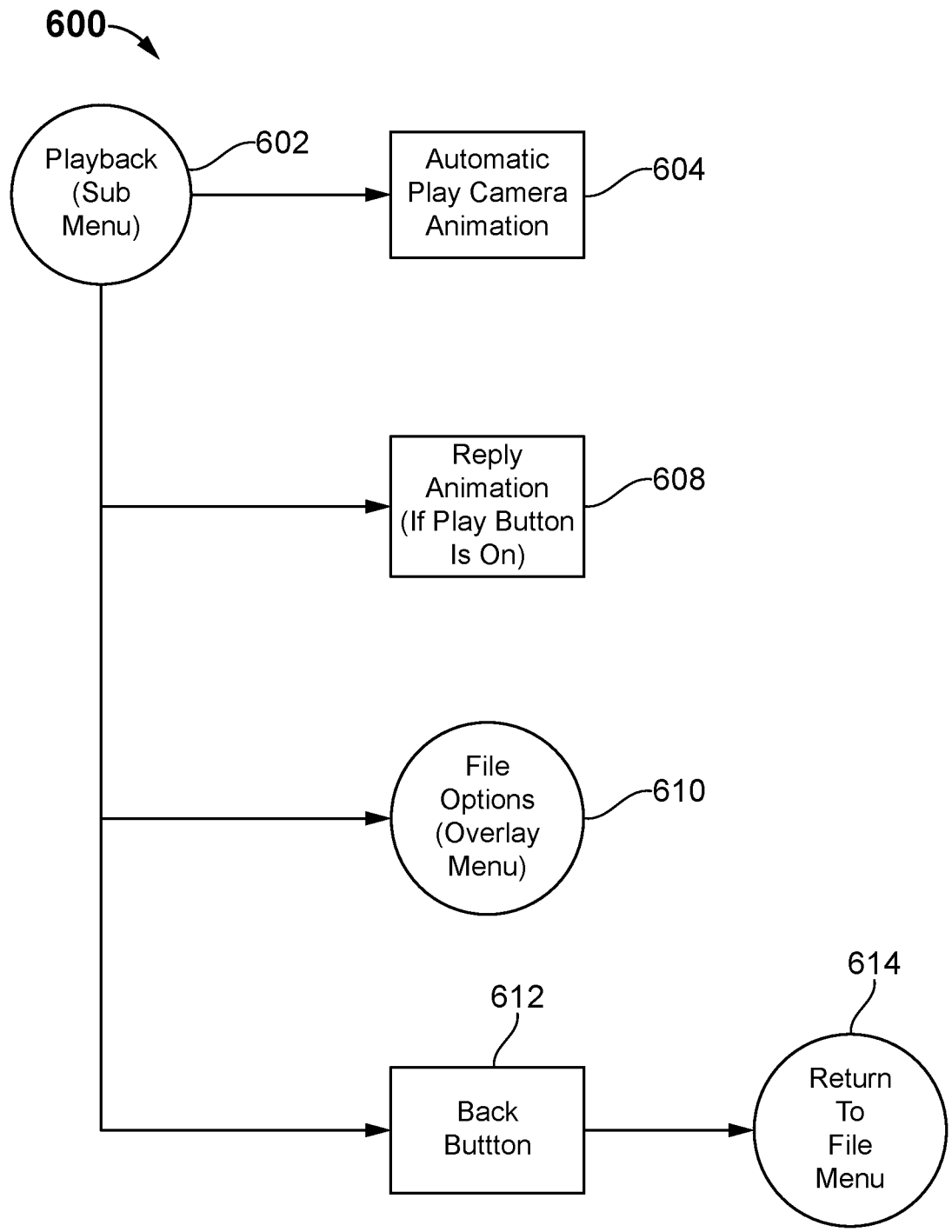
FIG. 6 illustrates a block diagram of a playback (submenu), according to an embodiment of the present invention.

Referring now to FIG. 6, a block diagram 600 of a playback (sub-menu) 602 is disclosed. In one embodiment, the playback (sub-menu) 602 provides the user different options such as, but not limited to, an automatic play camera animation 604, a replay animation (if play button is on) 608, file options (overlay menu) 610, and a back button 612 for the user to access file options. Further, the back button 612 is connected to a return 614 for opening the file menu. In operation, with all data and files in cloud, we can play back the scene to ensure there is no aberrant data. The ability to sort file, automatically start playing data that is captures in that file as a 3D scene, and that sequence then stops.

Figure 7:
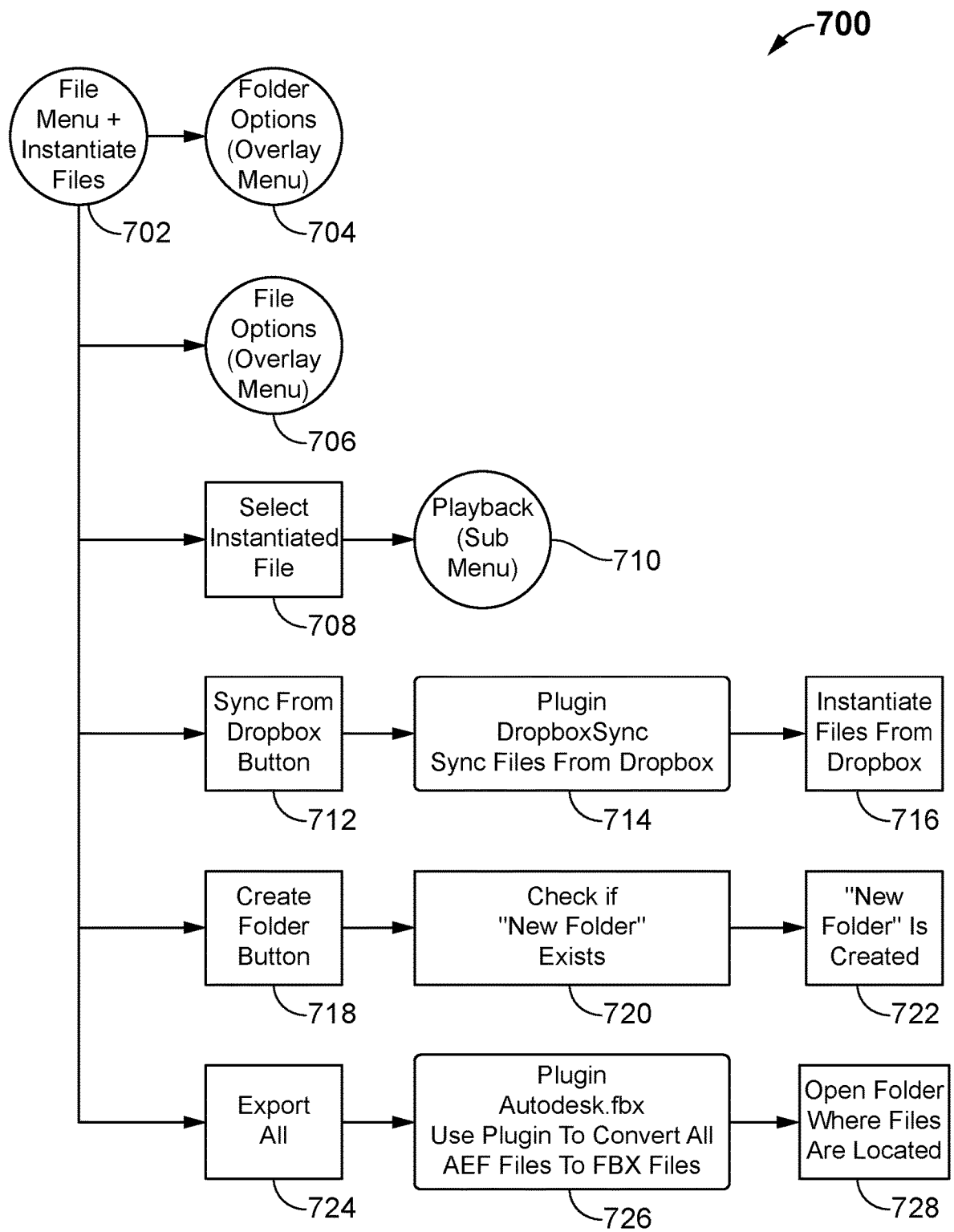
FIG. 7 illustrates a block diagram of a file menu plus instant files, according to an embodiment of the present invention.

Referring now to FIG. 7, a block diagram 700 of a file menu plus instant files 702 in one embodiment is disclosed. The file menu plus instant files 702 provides different menu options such as but not limited to, folder options (overlay menu) 704, file options (overlay menu) 706, a select instantiated file 708, a sync from dropbox button 712, a create folder button 718, and an explore all button 724 for the user to access the file and sync with the dropbox.

In one embodiment, the select instantiated file 708 is further connected to a playback (sub menu) 710. In one embodiment, the sync from dropbox button 712 is further connected to a plugin DropboxSync plus Sync files from dropbox 714, which is further connected to instantiate files from dropbox 716. In one embodiment, the create folder button 718 is further connected to a Check if "New Folder" exists 720, which is further connected to the created "New Folder" 722. In one embodiment, the explore all button 724 is further connected to a plugin Autodesk.fbx plus 726 that is plugin to convert all AEF files to FBX files, which is further connected to an open folder 728 where files are located.

Figure 8:
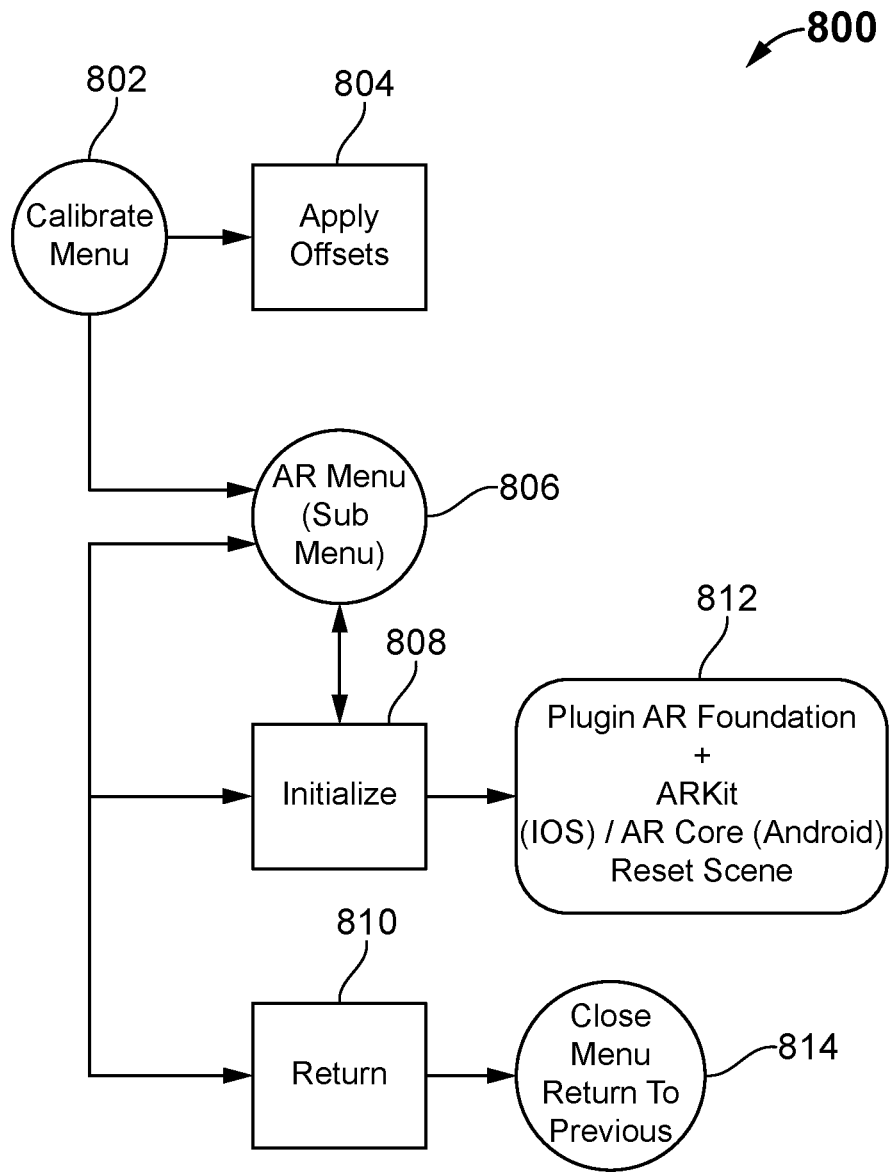
FIG. 8 illustrates a block diagram of a calibrate menu and initialize AR foundation, according to an embodiment of the present invention.

Referring now to FIG. 8, a block diagram 800 of a calibrate menu 802 and initialize AR foundation is disclosed. In one embodiment, the calibrate menu 802 is connected to an AR menu (sub-menu) 806 and also connected to apply offsets 804. In one embodiment, the AR menu (sub-menu) 806 is further connected to an initialize module 808 and a return menu 810. In operation, the ARkit® or ARcore® or core allows us to triangulate spatial features by building appoint could to what is coming into the camera, taking data points, and fusing them together to build AR scene, we can see where camera is moving, how fast it is moving.

In one embodiment, a plugin AR foundation with ARKit for IOS and/or ARCore for android plus reset scene 812 are connected to the initialize module 808. The AR foundation allows to work with augmented reality platforms. In one embodiment, the return module 810 is connected to a close menu return 814 for returning to previous menu.

Figure 9:
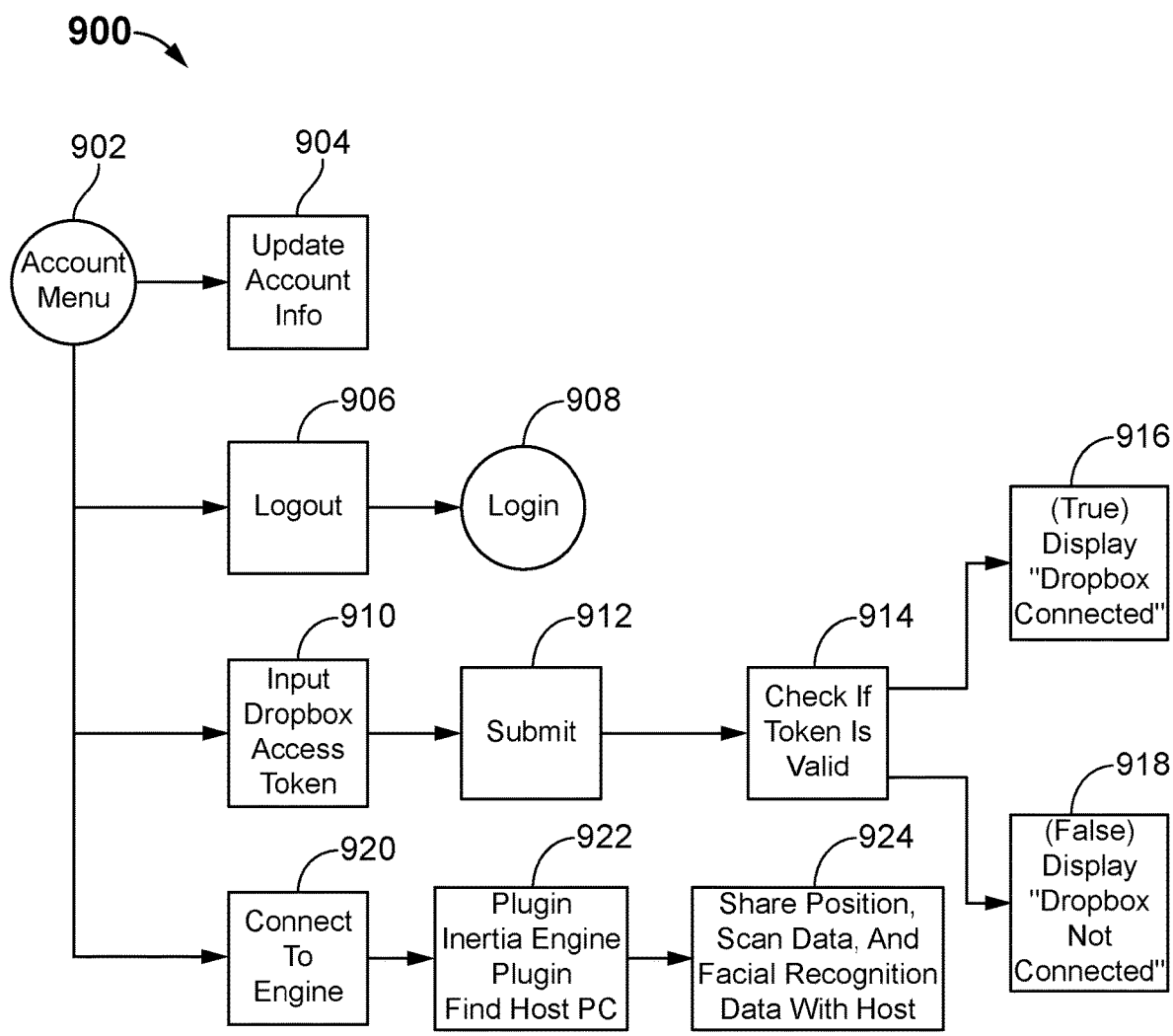
FIG. 9 illustrates block diagram for an account menu for accessing account info and input from the dropbox, according to an embodiment of the present invention.

Referring now to FIG. 9, shown at 900 is an account menu 902 for accessing account information and an input from the Dropbox® is disclosed. In one embodiment, the account menu 902 is connected to an update 904 for enabling the user to update account information. In one embodiment, the account menu 902 is further connected to a logout 906 and login options 908 for enabling the user to sign-in and sign-out for accessing the account information. In one embodiment, the account menu 902 is further connected to an input dropbox access token 910, which is further connected to a submit option 912 for connecting to the dropbox. In one embodiment, the submit option 912 is further connected to a check 914 for validating the token. Further, the check 914 for validating the token is connected to a (True) display "Dropbox® Connected" 916 and (False) display "Dropbox® Connected" 918 for checking the connection of the dropbox.

In one embodiment, the account menu 902 is further connected to an engine 920, which is further connected to plugin engine 922 and to find a host PC for sharing position, scan data, and facial recognition data 924. In operation, the system has a persisted sharing feature amongst users and peers.

Figure 10:
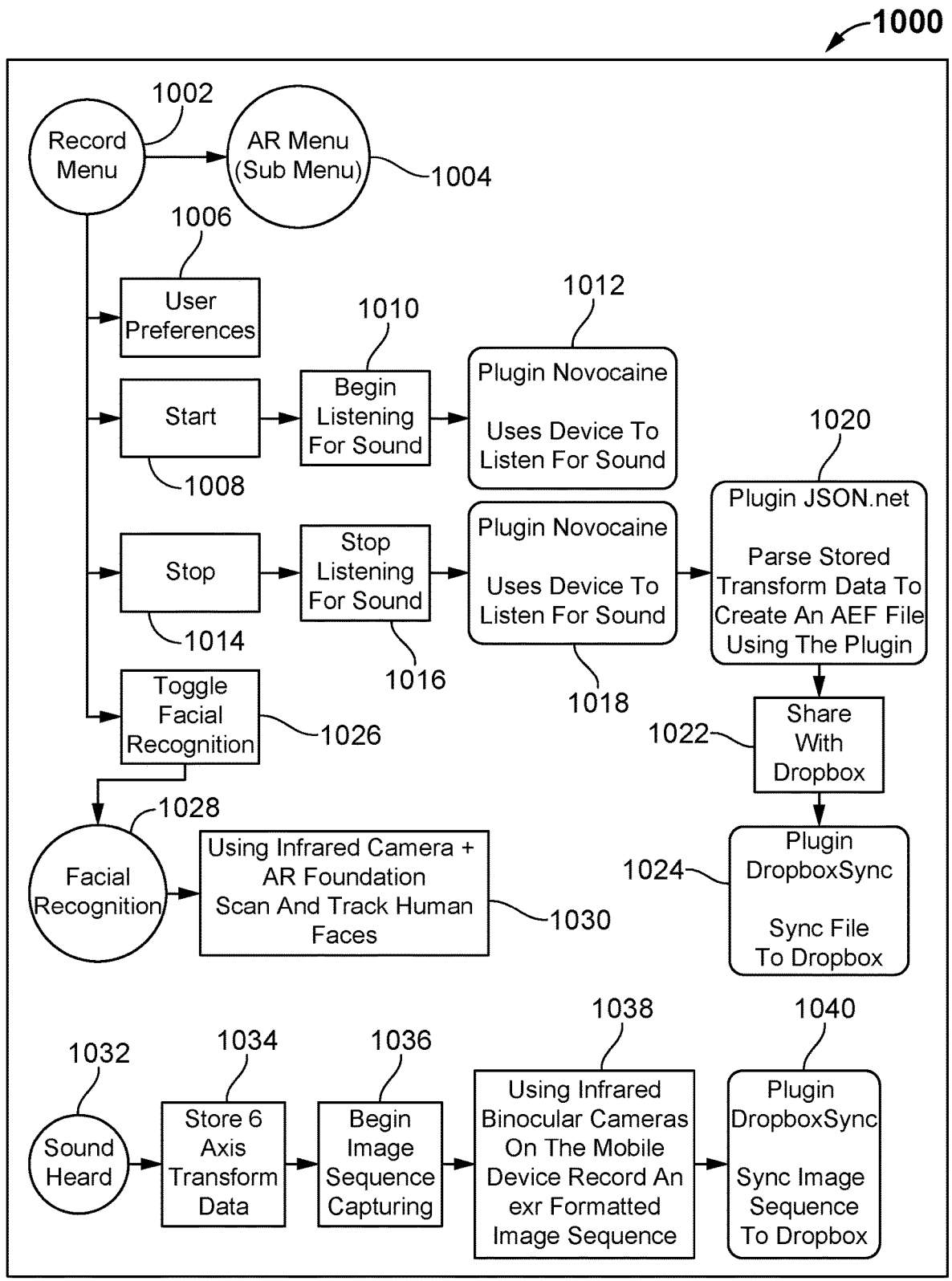
FIG. 10 exemplarily illustrates a block diagram for a record menu for accessing different options such as start and stop for listening sound, facial recognition, and share with the dropbox, according to an embodiment of the present invention.

Referring to FIG. 10, exemplarily illustrates a screenshot 1000 of a record menu 1000 for accessing different options such as start and stop for listening sound, facial recognition, and share with the dropbox in one embodiment is disclosed. In one embodiment, the record menu 1000 is connected to the AR menu (Sub Menu) 1004. The record menu 1000 enables the user to access user preferences 1006. The record menu 1002 shows multiple options such as, a start 1008, a stop 1014, and a toggle facial recognition 1026 for the user. The user could begin listening sound 1010 using the start 1008 and also plugin uses device to listen for sound 1012. In one embodiment, the user may stop listening sound 1016 using the stop 1014 and also plugin uses device to listen for sound 1018. Further, plugin JSON.net and parse stored transform data to create an AEF file using the plugin JSON.net 1020 then share the created AEF file with the dropbox 1022. In one embodiment, a plugin sync used for sync file to the Dropbox® 1024. In operation, this the modules described above perform a sync function with the scene that is being shot by the motion capturing device 102 so that the software executes at the same time the scene begins. Generally, a clapperboard is used, and when a scene begins the slate will clap, and once the slate claps a spike will be heard by the device and start gathering data for the camera solve. The data values are stored, and ran through algorithms to filter noise, then it is converted into an intermediary file is exported to a new format.

In one embodiment, the toggle facial recognition 1026 is connected to a facial recognition 1028. The facial recognition 1028 uses infrared camera and AR foundation 1030 for scanning and tracking human faces. In one embodiment, the record menu 1000 shows a sound heard 1032, which is connected to a store six-axis transform data 1034. In one embodiment, the user could start or begin image sequence capturing 1036 using infrared binocular cameras on the mobile device and record an exr formatted image sequence 1038. Further, plugin syncs image sequence to Dropbox 1040. In operation, toggling facial recognition will turn on cameras and create a facial map and use spatial data.

Figure 11:
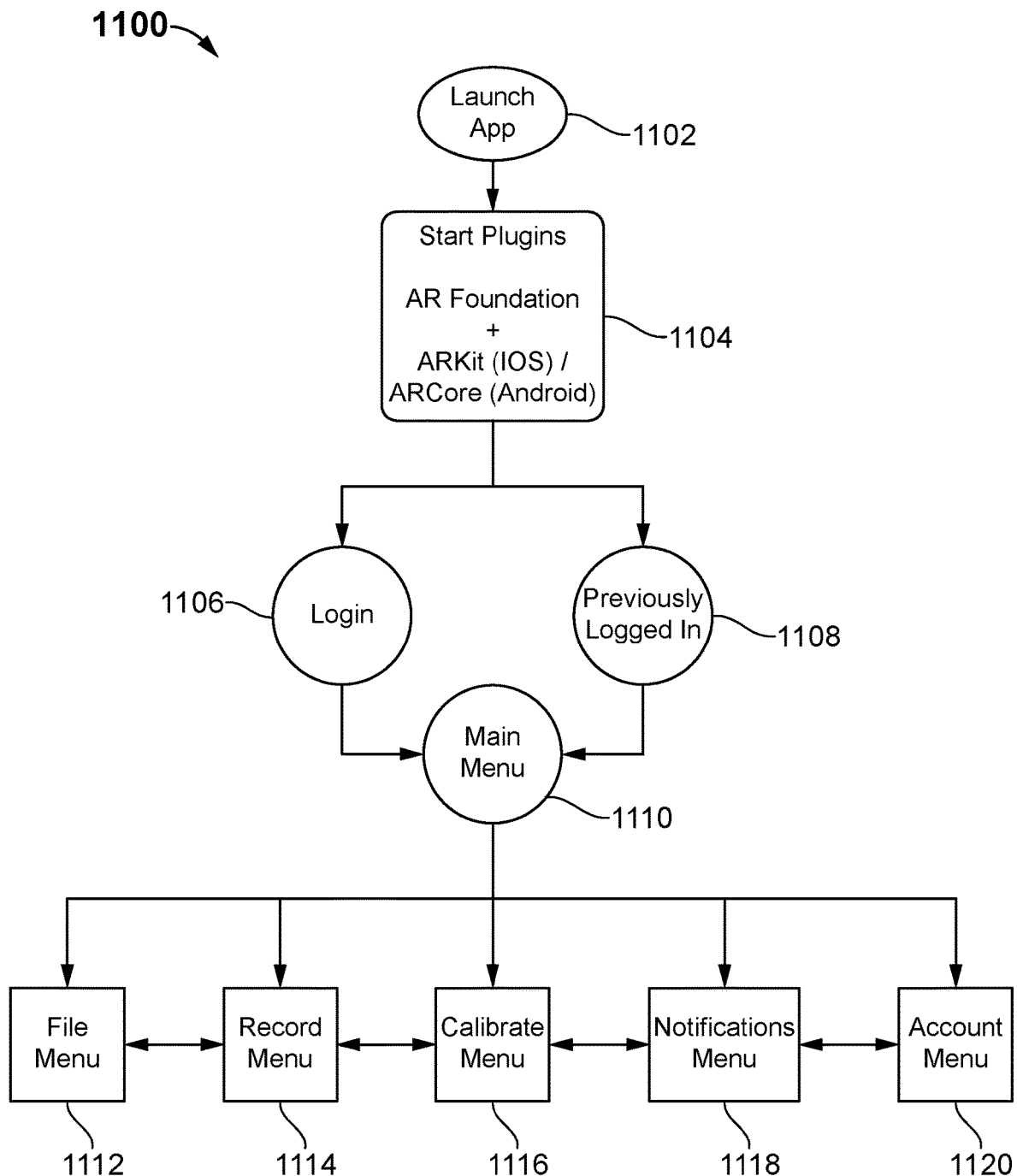
FIG. 11 exemplarily illustrates a block diagram for a main menu provides different menus for accessing files, records, notifications, and accounts, according to an embodiment of the present invention.

Referring now to FIG. 11, at 1100, an application launch is shown. This comprises main menu 1110 to provide different menus for accessing files, records, notifications, and accounts in one embodiment is disclosed. In one embodiment, the user downloads the software application from the launch app 1102 and installed in the user device 104 (shown in FIG. 1). The user starts plugins AR foundation 1104. The user may sign in into the software application for accessing the main menu 1110 using the login 1106 and previously logged in 1108. In one embodiment, the main menu 1110 is connected to different menus such as, but not limited to, a file menu 1112, a record menu 1114, a calibrate menu 1116, a notification menu 1118, and an account menu 1120 for accessing files, records, calibrating, notifications, and accounts.

Figure 12:
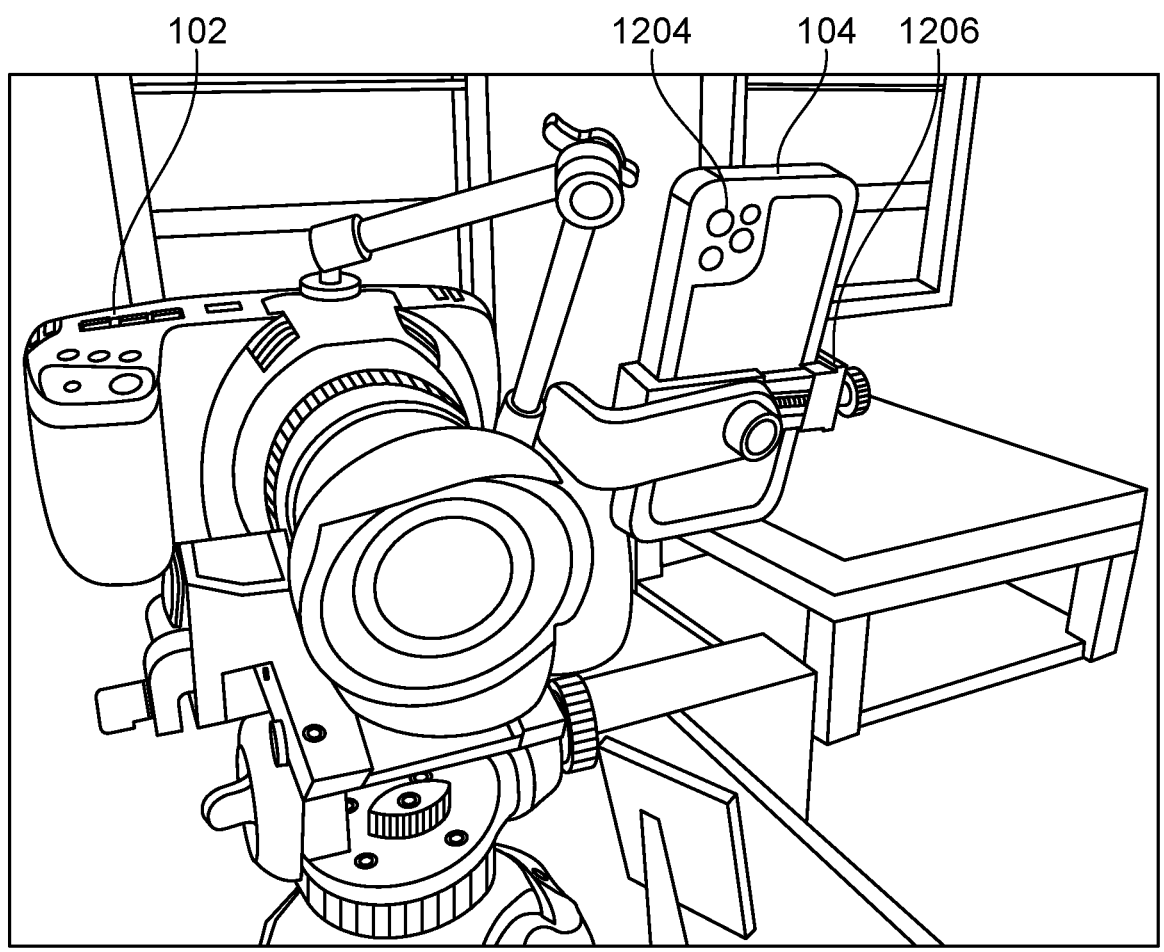
FIG. 12 illustrates a perspective view of the user device securely connected to the recording device for capturing the 3D motion data of the recording device, according to an embodiment of the present invention.

Referring to FIG. 12 a perspective views of the user device 104 (having camera 1204) is shown securely connected to the recording device 102 for capturing the 3D motion data of the recording device 102. The user device 102 is connected to the device via attachment member 1206, which has arms and pivots, and is movable before locking into place. In an embodiment, the 3D motion data comprises orientation and velocity of the recording device 102 which is captured by user device 104. After registration, the user device 104 allows the user to access the 3D motion data of the recording device 102. In one embodiment, the user device 104 used with the software application is configured to record sensor array data simultaneously while filming.

Figure 13:
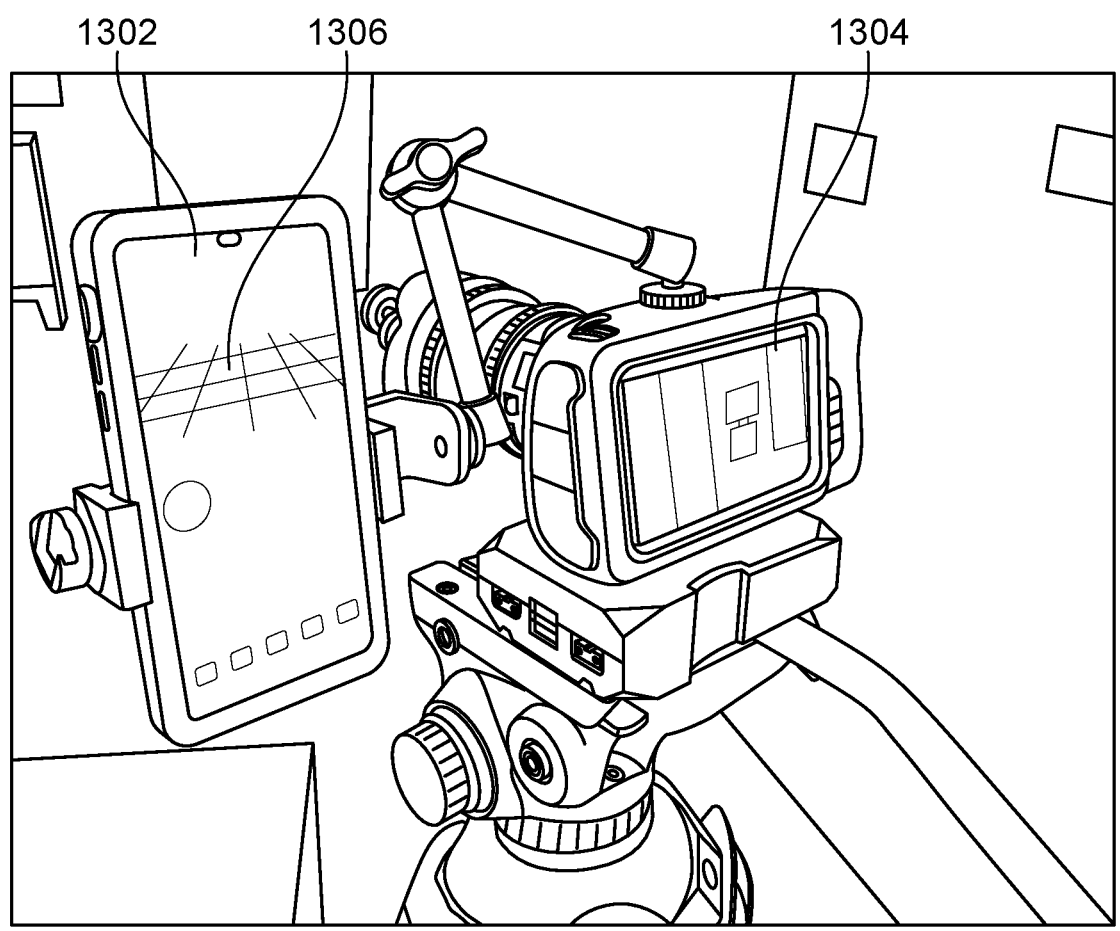
FIG. 13 illustrates another perspective view of the user device securely connected to the recording device for capturing the 3D motion data of the recording device, according to an embodiment of the present invention.

Referring now to FIG. 13 a perspective views of the user device 104 is shown securely connected to the recording device 102 for capturing the 3D motion data of the recording device 102. In this embodiment, the user interfaces 1302 having gridlines to track points in the frame and 1304 showing the principal photography can be seen. The user device 104 is connected to the device via attachment member 1206, which has pivots and is movable before locking into place. In an embodiment, the 3D motion data comprises orientation and velocity of the recording device 102 which is captured by user device 104. After registration, the user device 104 allows the user to access the 3D motion data of the recording device 102. In one embodiment, the user device 104 used with the software application is configured to record accelerometer sensor data simultaneously while filming.

Figure 14:
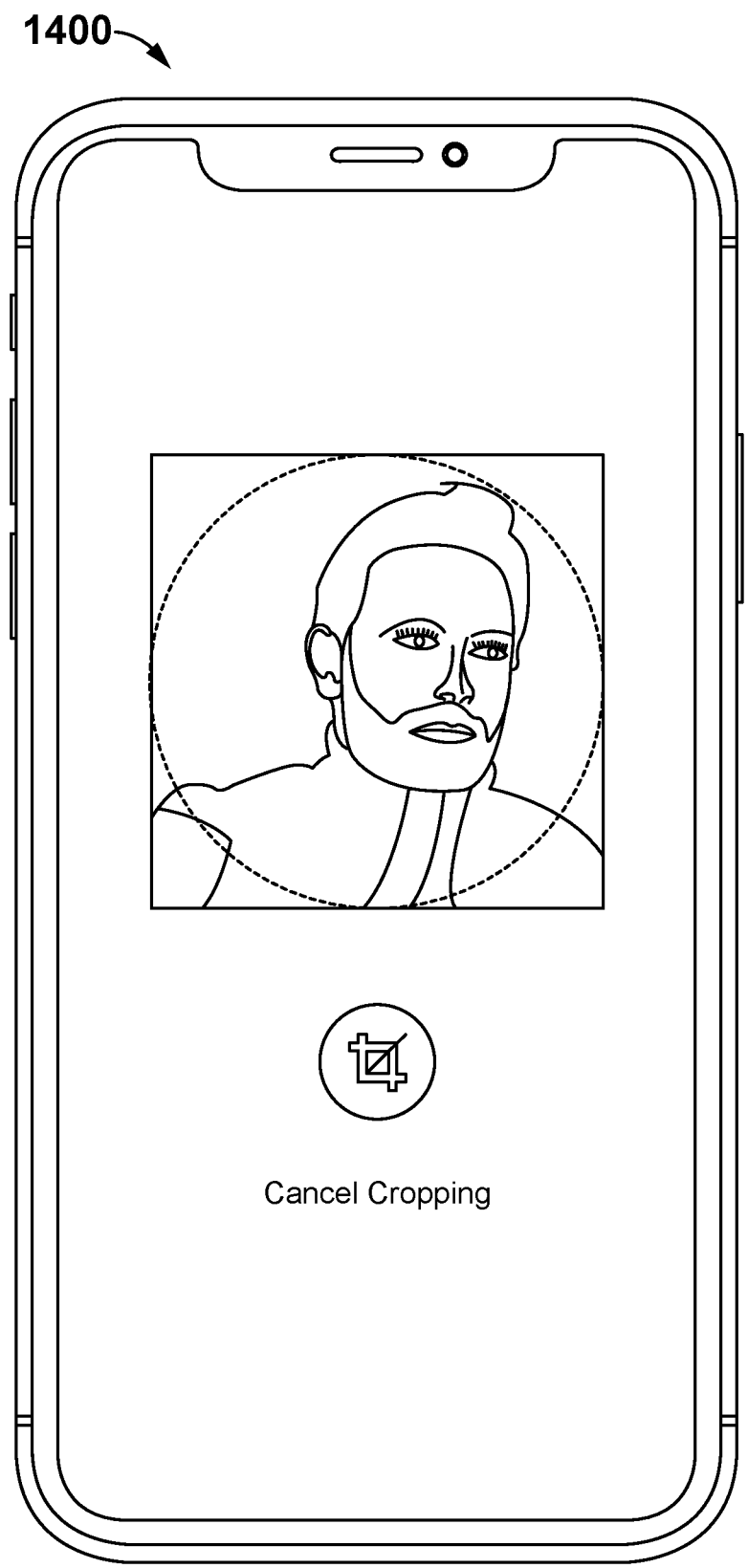
FIG. 14 illustrates a block diagram for interface with updated profile photo, according to another embodiment of the present invention.

Referring to FIG. 14, a screenshot 1400 of an interface with updated profile photo, according to one embodiment of the present invention is shown. In an embodiment, the profile management module 216 (shown in FIG. 2) executed at the processor 202 (shown in FIG. 2), is updated with the profile photo and registered details. The profile management module 216 comprises the registered user details and updated profile photo along with one or more input fields to update the personal information based on the user requirement. The input fields include, but not limited to, first name, last name, email address, username, new password and confirm password. In addition, the profile management module 216 comprises action buttons such as "Cancel" to discard the changes, "Update Profile" to allow the changes in the profile, and "Sign Out" to disconnect the user from the network 226 (shown in FIG. 2). In some embodiments, the profile management module 216 enables the user to manage and edit profile data.

Figure 15:
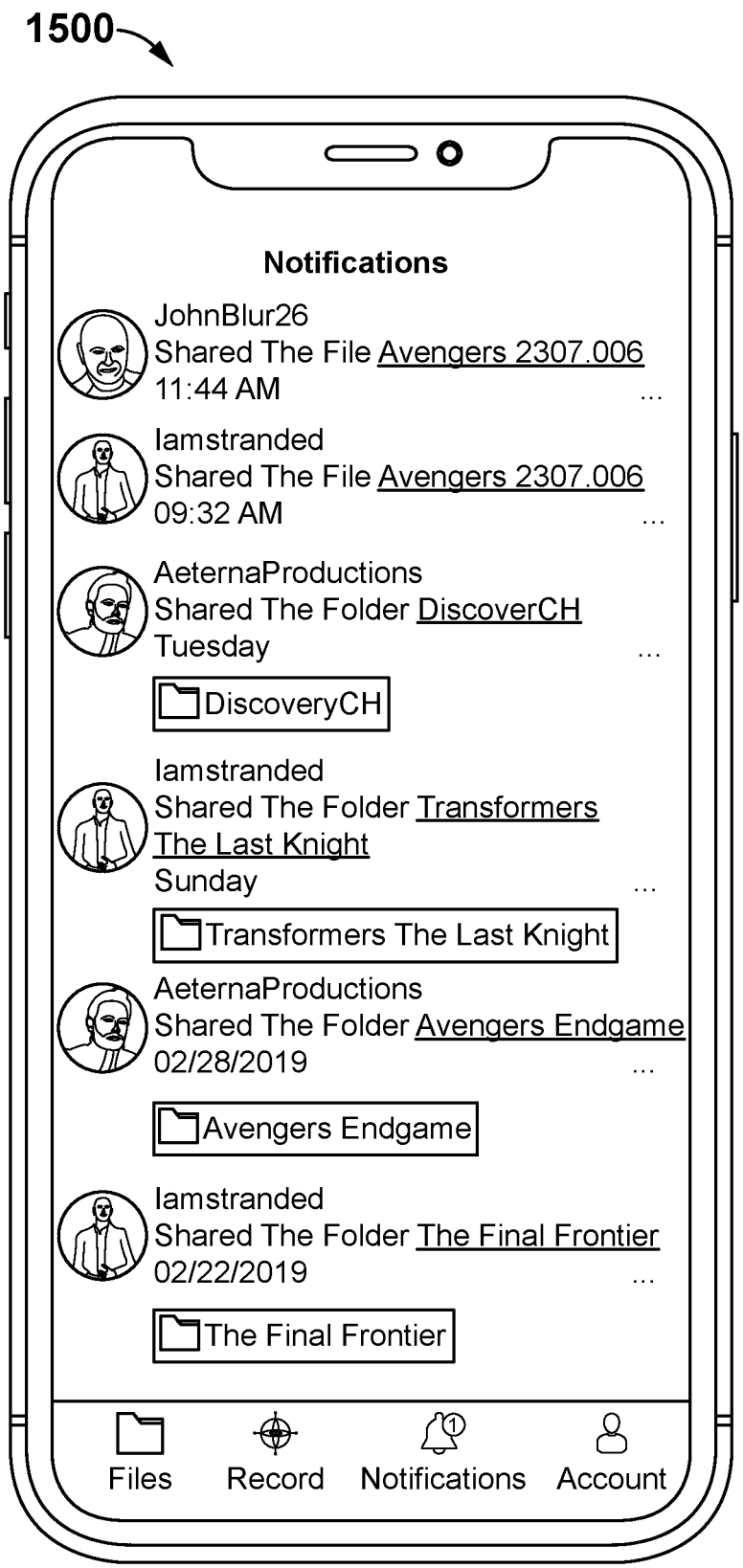
FIG. 15 exemplarily illustrates a block diagram for notification module, according to an embodiment of the present invention.

Referring to FIG. 15, a screenshot 1500 of a notification module 222 (shown in FIG. 2), according to one embodiment of the present invention is shown. The notification module 222 comprises one or more notifications received from one or more users. In an embodiment, the user receives notifications when their teammates/colleagues share files or folders. In some embodiments, the received notification comprising the details include, but not limited to, sender details and shared file or folder details. In one embodiment, the sender details include, but not limited to, username of sender and profile photo of sender. In one embodiment, the shared file or folder details include, but not limited to, file name or folder name, shared date, shared day or shared time.

Figure 16:
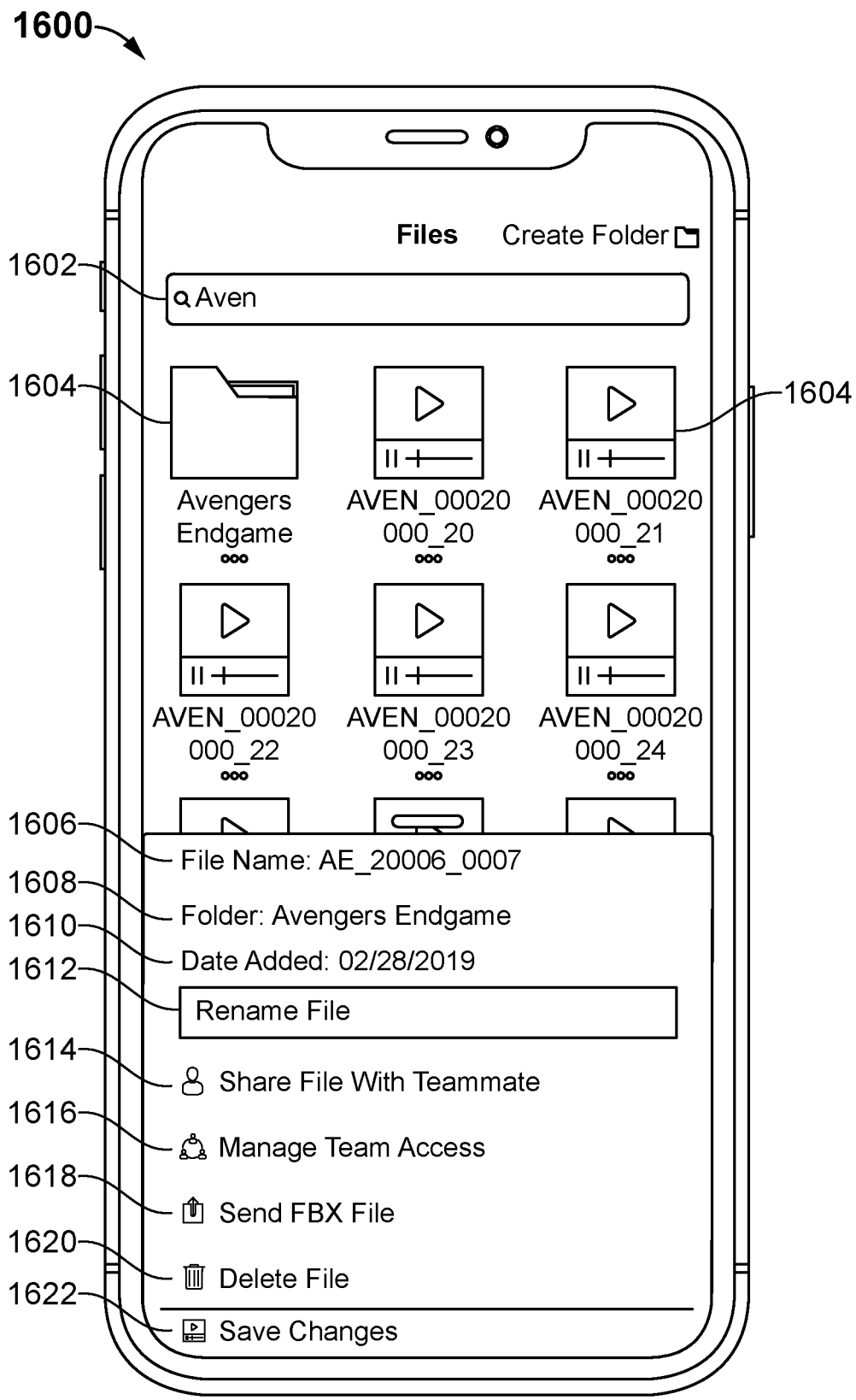
FIG. 16 illustrates a screenshot comprising a list of saved folders and files with more option icon, according to an embodiment of the present invention.

Referring to FIG. 16, a screenshot 1600 comprising a list of saved folders and files with more option icon, for example, a search engine 1602, according to one embodiment of the present invention is shown. In an embodiment, the stored folder comprises the details such as folders 1604, a folder name 1606, a folder 1608 with a folder name, a folder added date and save changes (1610 and 1622), along with a more option icon. In an embodiment, the user could search the required file or folder via the search engine 1602 by entering the file name or folder name. In some embodiments, the more option icon comprising one or more features including, but not limited to, a Rename folder or file 1612, a Share folder with teammate 1614, Manage team access 1616, Manage existing shared settings, Send a zip folder containing files, Export and send FBX file of data 1618, and Delete file or folder 1620. In some embodiments, the one or more features empowers the user to make adjustments and share data quickly without the need of accessing each individual folder. In an embodiment, the "Files" further comprising a "Create Folder" option, thereby enabling the user to create a new folder. All the recorded and received files and folders are stored in this "Files".

Figure 17:
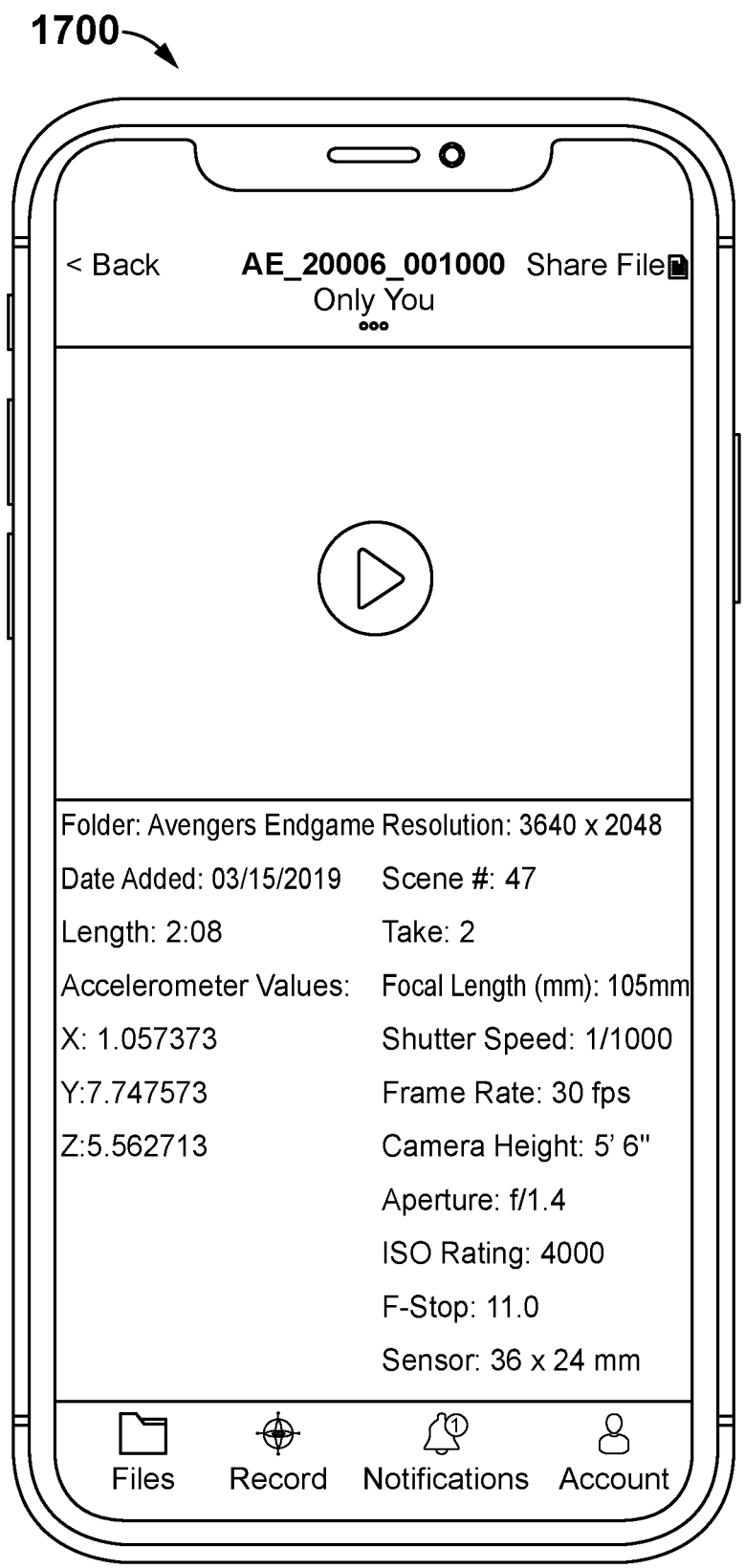
FIG. 17 illustrates a block diagram for an opened file with corresponding 3D motion data and more option, according to an embodiment of the present invention.

Referring to FIG. 17, a screenshot 1700 of an opened file 1802 with corresponding 3D motion data and more option icon, according to one embodiment of the present invention is shown. In one embodiment, the opened file with the corresponding 3D motion data enables the user to view the data visualization of any recorded file and playback recorded XYZ data, is exemplarily illustrated in FIG. 17. In an embodiment, the 3D motion data comprises camera and sensor data as inputs. In some embodiments, the input data comprises but not limited to, resolution, scene number, take number, focal length (mm), shutter speed, frame rate, camera height (imperial or metric), aperture, ISO rating, F-Stop, and sensor. In one embodiment, the opened file shows the file details such as folder name, date added, length, and accelerometer values (XYZ axis values).

Figure 18:
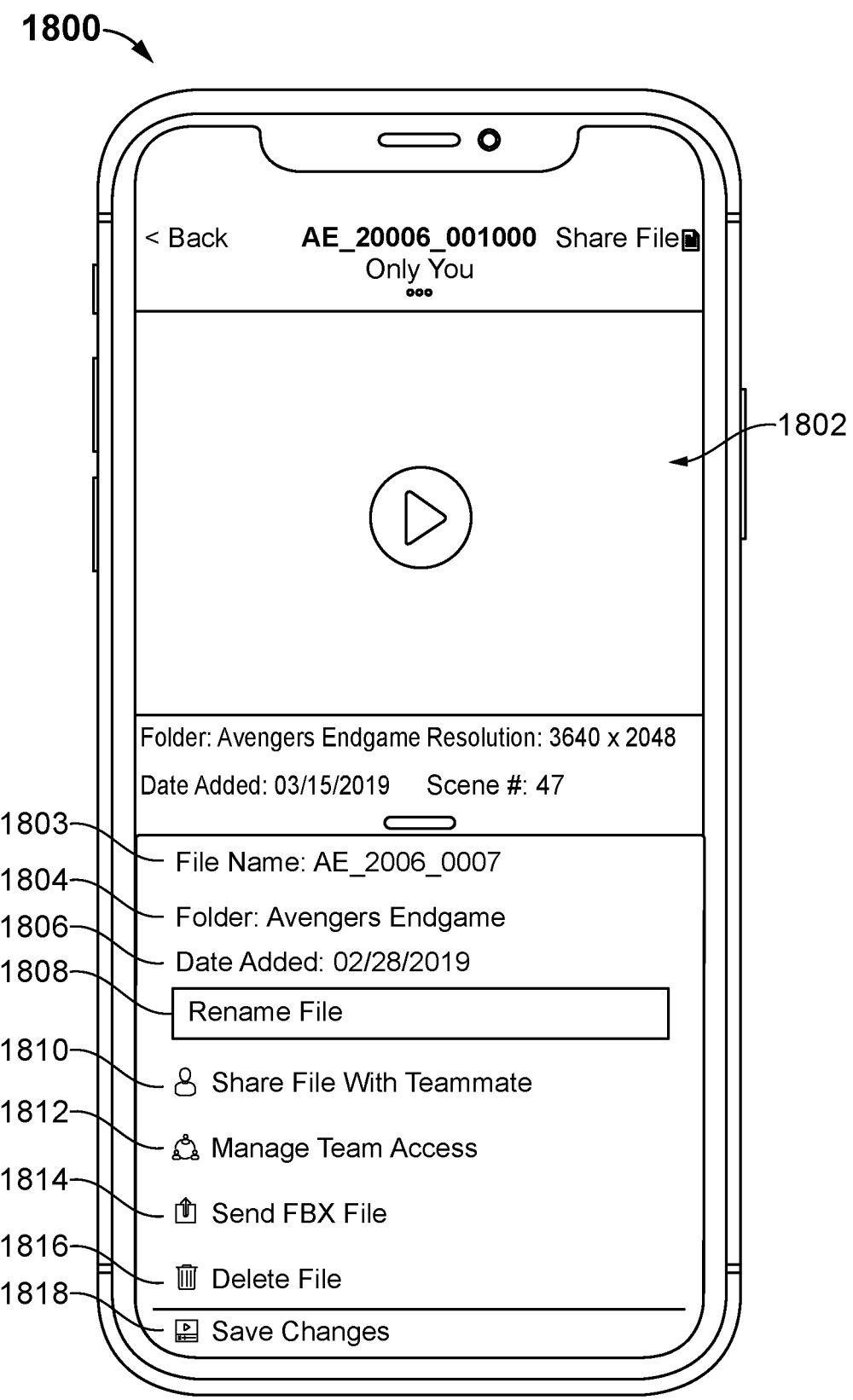
FIG. 18 illustrates a block diagram for opened file with corresponding 3D motion data and more option, according to an embodiment of the present invention.

Referring to FIG. 18, a screenshot 1800 of an opened file 1802 with corresponding 3D motion data and more option icon, according to one embodiment of the present invention is shown In some embodiments, the more option icon comprising one or more features including, but not limited to, rename file 1808, Share File with Teammate 1810, Manage team access 1812, Send FBX file 1814, Delete File 1816, and Save Changes 1818. In one embodiment, the opened file shows the file details such as file name 1803, folder 1804, date added 1806. In an embodiment, the user could change and update the file name via "Save Changes 1818". In some embodiments, the user could convert their data into one of several file types including, but not limited to, fbx (Autodesk Filmbox File) or .aec (Adobe® After Effects Scene File). In an embodiment, the data is downloaded from any of the database, cloud, or local storage synced with the user device. In an embodiment, the exported files such as .fbx file, shared via an email.

In an embodiment, the user could open their files in a 3D application such as Maya®, Houdini®, Cinema 4D® or a compositing application such as Adobe® After Effect and Nuke®, after downloaded from the database. Further, the system 100 saves expensive time in the visual effects pipeline, bypassing tedious match-moving processes, which are difficult to accomplish. It will deliver an accurate 3D camera solve directly from principle.

Figure 19:
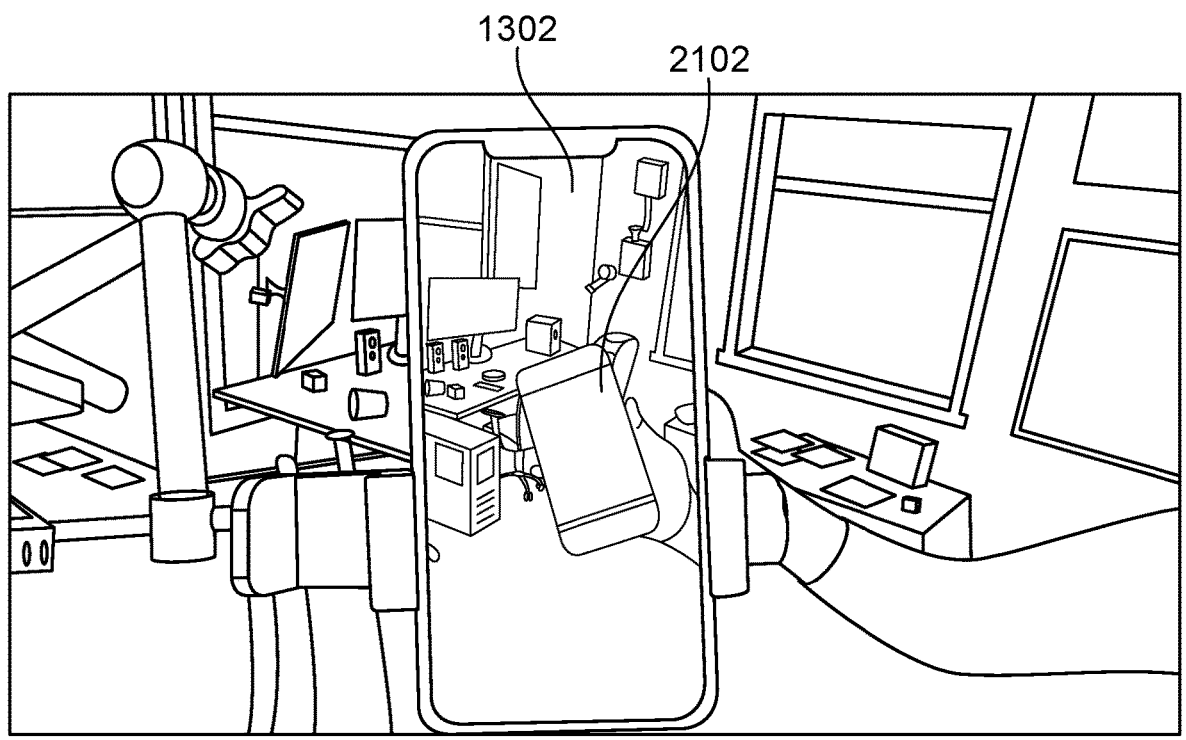
FIG. 19 illustrates a perspective view of the user device securely connected to the recording device for capturing the 3D motion data of the recording device, according to an embodiment of the present invention.
Figure 20:
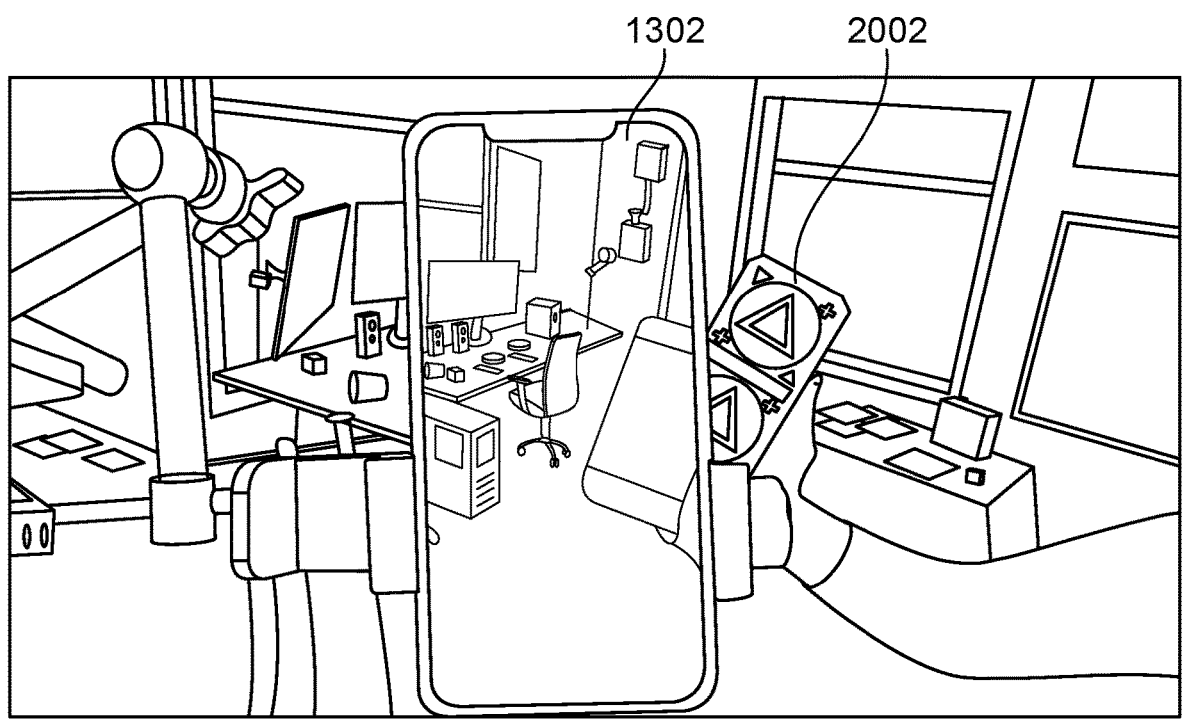
FIG. 20 illustrates another perspective view of the user device securely connected to the recording device for capturing the 3D motion data of the recording device, according to an embodiment of the present invention.

Referring to FIG. 19 and FIG. 20, perspective views of the user device 1302 securely connected to the recording device 102 for capturing the 3D motion data of the recording device 102 in one embodiment is disclosed. The user device 1302 is configured to connect to the recording device 102 to capture the 3D motion data of the recording device 102. In an embodiment, the 3D motion data comprises orientation and velocity of the recording device 102. After registration, the user device 1302 allows the user to access the 3D motion data of the recording device 102. In one embodiment, the user device 1302 used with the software application is configured to record accelerometer sensor data simultaneously while filming.

In one embodiment, a method for capturing the 3D motion of recording device 102 comprising one or more steps. At one step, the method comprises calibrating a position of the user device 1302 to a position of the recording device 102 via a calibration module 210 (shown in FIG. 2). At another step, the method comprises enabling the user to input data relating to the array of sensors 106 (shown in FIG. 2) and the recording device 102 via an input module 212 (shown in FIG. 2). In some embodiments, the input data comprises but not limited to, resolution, scene number, take number, focal length (mm), shutter speed, frame rate, camera height (imperical or metric), aperture, ISO rating, F-Stop and sensor. At another step, capturing 3D motion data of the recording device 102 via the recorder module 214. By pressing "Record" in the record module 214 (shown in FIG. 2), the pitch, yaw and roll data (XYZ/3D axis data) and camera movement is viewed in real time. The 3D axis data and an MP4 containing a playback of data visualization are stored in the files. In an embodiment, the user may create a new recording using the same recording device 102 and sensor data.

The system 100 provides any creator of any size budget to accurately and expediently match-move a shot with ease. Further, the present invention 100 provides a cost-effective system to remove the barrier of entry for creators to include visual effects in their projects. Also, the system 100 avoids cables, expensive sound stage, and costly equipment. The system can be used in any location and on any camera using any mobile device. This solves the budgetary and logistical problems that are associated with using current solution.

Preferred embodiments of this invention are described herein, including the best mode known to the inventors for carrying out the invention. It should be understood that the illustrated embodiments are exemplary only, and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

I claim:

1. A system to automate match moving in a visual effects (VFX) process to insert computer graphics into live action footage for principal photography, the system comprising:
  a recording device comprising a first user interface showing the live action footage, wherein the recording device is a motion-capturing camera, that during system operation, is configured to be physically in motion during the live action footage for the principal photography during a period of the principal photography;
  a user device comprising a second user interface configured wherein the user device is mechanically connected to the recording device, wherein the user device is a smart device comprising a sensor array, wherein the sensor array captures at least a three-dimensional motion data, orientation data, and a velocity vector data of the recording device when the recording device is in motion and is capturing the live action footage for the principal photography;
  an attachment member configured to mechanically, adjustably, but not electronically, couple the user device to the recording device at a distance from the recording device so that when the recording device is in motion and is in the process of capturing the live action footage, the user device is also in motion via the attachment member;
  a server comprising a processor and a memory in communication with the processor, wherein the user device is in communication with the server, and wherein the server is configured to store a set of program modules executable by the processor and receive inputs and outputs from the user device, the program modules comprising:
    an input module for receiving input data from the user device regarding a lens profile of the recording device, the orientation of the user device with respect to the recording device, and the distance of the user device from the recording device;
    a calibration module configured to receive the data regarding the lens profile of the recording device, the orientation of the user device with respect to the recording device, and the distance of the user device from the recording device, and further receive the orientation data of the recording device, the three-dimensional motion data and the velocity vector data of the recording device using based on a changing position of the recording device and the user device over time, and continuously calibrate a position of the recording device during a recording session;
    a recorder module for receiving the orientation data, the three-dimensional motion data and the velocity vector data from the user device via the sensor array;
    a conversion module configured to combine the data regarding the lens profile of the recording device, the orientation of the user device with respect to the recording device, and the distance of the user device from the recording device, the orientation data of the recording device, the three-dimensional motion data and velocity vector data of the recording device based on a changing position of the recording device during the live action footage and the user device over time to form a combined data file comprising the lens profile, the orientation of the user device with respect to the recording device, the device using, the distance of the user device from the recording device, the orientation data of the recording device, the three-dimensional motion data and velocity vector data of the recording device based on a changing position of the recording device and the use device during the live action footage;

a composite module configured use the combined data file and transform the data to a file format in response to a user input, wherein the composite module is configured to use the file format to produce an accurate three-dimensional match moving solve directly from the principal photography and to further automate the match moving process to insert the composite image into the principal photography.

2. The system of claim 1, wherein the motion data is three rotation axes X-Y-Z matrix, and the velocity vector is three velocity vectors.

3. The system of claim 1, further comprising an input module for receiving inputs comprising:
a frame rate of the recording device;
a resolution of the recording device.

4. The system of claim 3, wherein the conversion module further combines the data for the frame rate, the resolution and the lens profile with the position of the user device relative to the lens of the recording device, and the motion data and velocity vector data and transform the data into a JSON file for storage on a network.

5. The system of claim 4, wherein the conversion module comprises a Kalman filter and filters the data for statistical noise, and wherein the conversion module converts the data into .fbx or .aec.

6. The system of claim 3, wherein the conversion module outputs the JSON file to the compositing suite, three-dimensional application, or both, so that a visual element is accurately placed in the composite image.

7. The system of claim 1, wherein the recorder module is configured to store the captured motion data and velocity vectors in at least one of the database, a cloud or the user device.

8. The system of claim 1, wherein the attachment member comprises arms and pivots so that it is movable before locking into place.

9. The system of claim 1, wherein the sensor array comprises an infrared LED and infrared light detector, wherein the infrared LED and infrared light detector ascertain the position of the user device relative to the motion capturing device.

10. The system of claim 1, wherein the user device further comprises
a microphone in communication with the recorder module for syncing data input with a scene that is being recorded by the recording device, wherein when the microphone hears a slate of a clapperboard the recorder module begins gathering data from the sensor array; and
a camera configured to start image sequence capturing.

11. A method to automate match moving in a visual effects (VFX) process, to insert computer graphics into live action footage for principal photography the method comprising:

coupling, using an attachment member configured to mechanically, adjustably but not electronically, a recording device to a user device at distance from the recording device so that when the recording device is in motion and is in the process of capturing live action footage, the user device is also in motion via the attachment member wherein the recording device comprising a first user interface showing the live action footage, wherein the recording device is a motion-capturing camera, that during system operation, is configured to be physically in motion during the live action footage for principal photography during a period of principal photography, wherein the user device comprising a second user interface;

capturing, using the sensor array at least a three-dimensional motion data, orientation data and a velocity vector data of the recording device when the recording device is in motion and is capturing the live action footage for principal photography, receiving data regarding a lens profile of the recording device, the orientation of the user device with respect to the recording device, and the distance of the user device from the recording device at a server, wherein the user device is in communication with the server, and receive inputs and outputs from the user device;

receiving the three-dimensional motion data, the orientation data, and the velocity vector data from the sensor array at a server;

receiving the orientation data of the recording device, the orientation of the user device with respect to the recording device and the distance of the user device from the recording device, the three-dimensional motion data and the velocity vector data of the recording device based on a changing position of the recording device during capturing of the live footage and the user device over time at a calibration module;

continuously calibrating a position of the user device relative to a position of a lens of a recording device, the orientation of the user device with respect to the recording device, and the distance of the user device from the recording device, at the calibration module during a recording session;

combining the data regarding the lens profile of the recording device, the orientation of the user device with respect to the recording device, and the distance of the user device from the recording device, the orientation data of the recording device, the three-dimensional motion data and velocity vector data of the recording device based on a changing position of the recording device and the user device during the live action footage to form a combined data file comprising the lens profile, the orientation of the user device with respect to the recording device, the device, the distance of the user device from the recording device, the orientation data of the recording device, the three-dimensional motion data and velocity vector data of the recording device based on a changing position of the recording device during the live action footage and the user device;

reformatting, using a composite module, the combined data and transforming the data into a file format in response to a user input;

producing an accurate three three-dimensional match moving solve using the file format directly from the principal photography and further automating the match moving in to allow a user to insert the composite image into the principal photography.

12. The method of claim 11, wherein the motion data is three rotation axes X-Y-Z matrix, and the velocity vector is three velocity vectors.

13. The method of claim 11, further comprising inputting, via an input module:
a frame rate of the recording device;
a resolution of the recording device.

14. The method of claim 13, further comprising combing and reformatting the data for the frame rate, the resolution and the lens profile with the position of the user device relative to the lens of the recording device, and the motion data and velocity vector data and transforming the data into a JSON file for storage on a network.

15. The method of claim 14, further comprising filtering the data for statistical noise, using a Kalman filter and filter, and converting the data into .fbx or .aec files.

16. The method of claim 13, further outputting the JSON file to the compositing suite, three-dimensional application, or both, so that a visual element is accurately placed in the composite image.

17. The method of claim 11, further comprising storing the captured motion data and velocity vectors in at least one of the database, a cloud or the user device.

18. The method of claim 11, wherein the attachment member comprises arms and pivots so that it is movable before locking into place.

19. The method of claim 11, further comprising ascertaining the position of the user device relative to the motion capturing device using an infrared LED and infrared light detector, wherein the infrared LED and infrared light detector.

20. The method of claim 11, further comprising listening, via a microphone in on the user device in communication with the recorder module, a slate of a clapperboard the recorder module begins gathering data from the sensor array to sync data input with a scene that is being recorded by the recording device.

* * * * *